US011990586B2

(12) United States Patent
Otsuka et al.

(10) Patent No.: US 11,990,586 B2
(45) Date of Patent: May 21, 2024

(54) SECONDARY BATTERY

(71) Applicant: Murata Manufacturing Co., Ltd., Nagaokakyo (JP)

(72) Inventors: Masahiro Otsuka, Nagaokakyo (JP); Toru Kawai, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 939 days.

(21) Appl. No.: 16/276,942

(22) Filed: Feb. 15, 2019

(65) Prior Publication Data
US 2019/0181505 A1    Jun. 13, 2019

Related U.S. Application Data

(63) Continuation of application No. PCT/JP2017/033095, filed on Sep. 13, 2017.

(30) Foreign Application Priority Data

Nov. 29, 2016   (JP) .................................. 2016-231707

(51) Int. Cl.
*H01M 10/0583*    (2010.01)
*H01M 10/04*    (2006.01)
(Continued)

(52) U.S. Cl.
CPC ... *H01M 10/0583* (2013.01); *H01M 10/0436* (2013.01); *H01M 10/0585* (2013.01);
(Continued)

(58) Field of Classification Search
None
See application file for complete search history.

(56) References Cited

U.S. PATENT DOCUMENTS 6,368,744 B1    4/2002    Hatazawa et al.
6,689,511 B2    2/2004    Yamada et al.
(Continued)

FOREIGN PATENT DOCUMENTS

JP    2000156208 A    6/2000
JP    2000285881 A    10/2000
(Continued)

OTHER PUBLICATIONS

International Search Report issued in PCT/JP2017/033095, dated Dec. 5, 2017.
(Continued)

*Primary Examiner* — Stewart A Fraser
(74) *Attorney, Agent, or Firm* — Arentfox Schiff LLP

(57) ABSTRACT

A secondary battery including an electrode assembly including a positive electrode, a negative electrode, and a separator disposed between the positive electrode and the negative electrode, and an electrolyte encapsulated in an exterior body. The exterior body has a shape with a cutout portion in planar view thereof, and the exterior body has a seal portion along a peripheral edge portion thereof. The seal portion is folded in a thickness direction of the secondary battery to form a folded seal portion having an end on a cutout portion side to form a stopper portion for a board disposed in the cutout portion.

20 Claims, 24 Drawing Sheets

(51) Int. Cl.
*H01M 10/0585* (2010.01)
*H01M 10/0587* (2010.01)
*H01M 50/105* (2021.01)
*H01M 50/121* (2021.01)
*H01M 50/136* (2021.01)
*H01M 50/202* (2021.01)
*H01M 50/463* (2021.01)

(52) U.S. Cl.
CPC ..... *H01M 10/0587* (2013.01); *H01M 50/105* (2021.01); *H01M 50/121* (2021.01); *H01M 50/136* (2021.01); *H01M 50/202* (2021.01); *H01M 50/463* (2021.01)

(56) References Cited

U.S. PATENT DOCUMENTS

| | | |
|---|---|---|
| 7,846,580 B2 | 12/2010 | Oh |
| 9,548,475 B2 | 1/2017 | Kang et al. |
| 9,905,891 B2 | 2/2018 | Ryu et al. |
| 2001/0005561 A1 | 6/2001 | Yamada et al. |
| 2005/0084749 A1* | 4/2005 | Hwang ............ H01M 10/0436 429/127 |
| 2006/0105237 A1 | 5/2006 | Oh |
| 2014/0113184 A1* | 4/2014 | Hamel ................ H01M 2/0202 429/179 |
| 2015/0037664 A1 | 2/2015 | Kang et al. |
| 2015/0372353 A1 | 12/2015 | Ryu et al. |

FOREIGN PATENT DOCUMENTS

| | | |
|---|---|---|
| JP | 2001167743 A | 6/2001 |
| JP | 2002260608 A | 9/2002 |
| JP | 2006093101 A | 4/2006 |
| JP | 2015518256 A | 6/2015 |
| JP | 2016506606 A | 3/2016 |

OTHER PUBLICATIONS

Written Opinion of the International Searching Authority issued in PCT/JP2017/033095, dated Dec. 5, 2017.

* cited by examiner

FIG. 8A - PRIOR ART
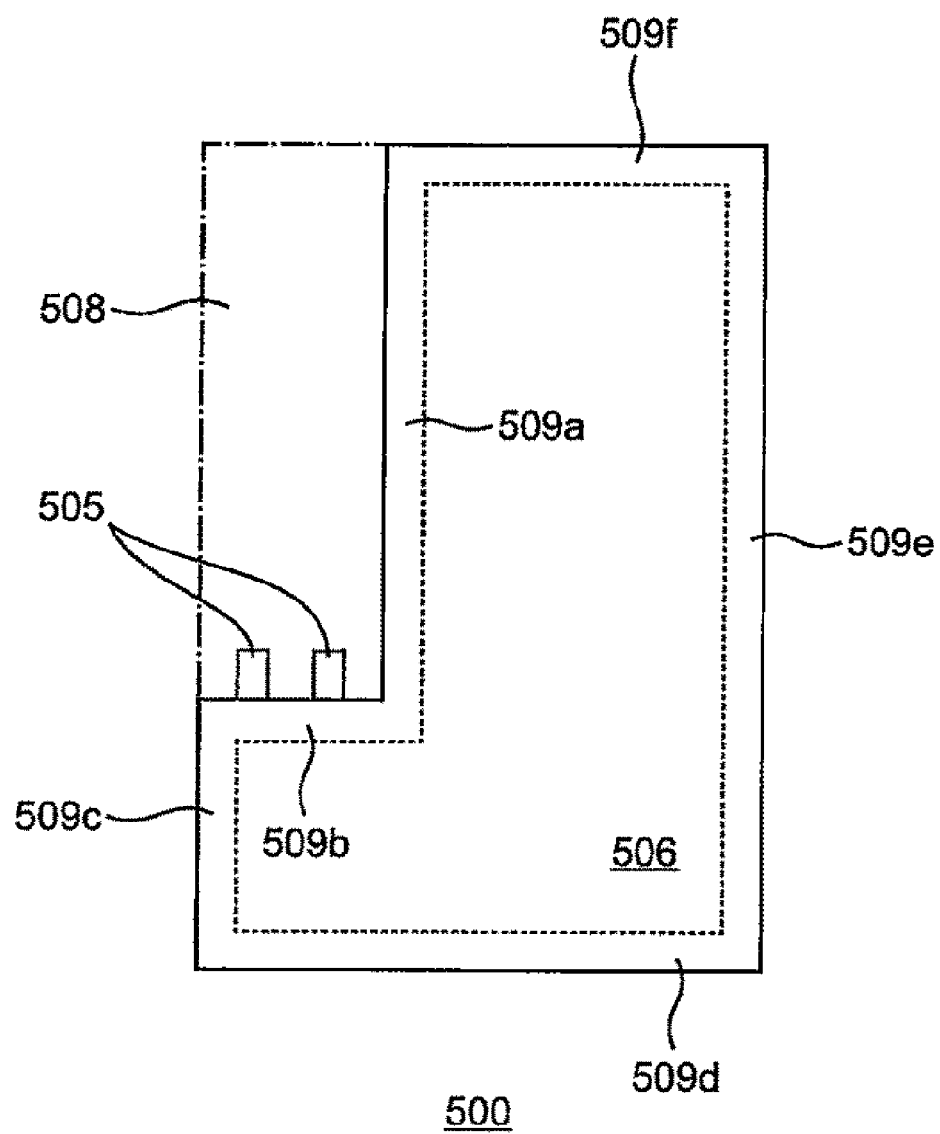

FIG. 8B - PRIOR ART
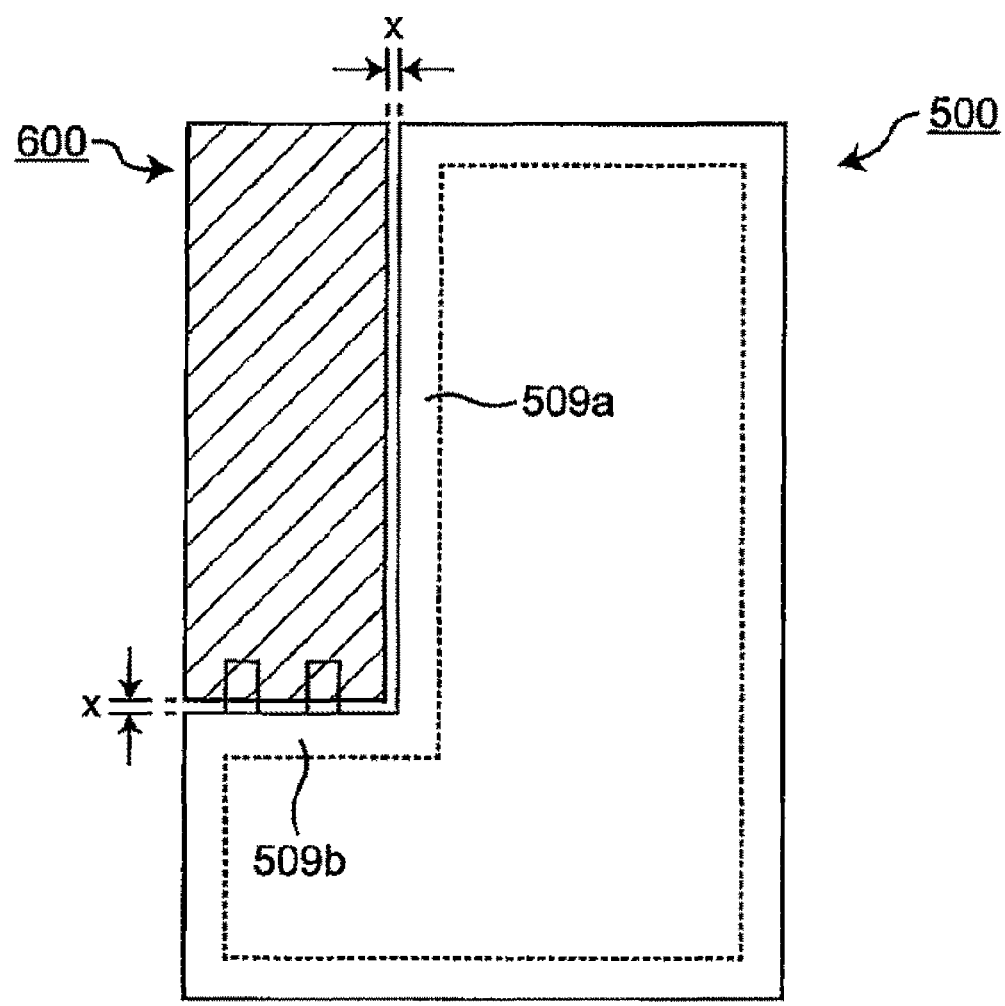

SECONDARY BATTERY

CROSS REFERENCE TO RELATED APPLICATIONS

The present application is a continuation of International application No. PCT/JP2017/033095, filed Sep. 13, 2017, which claims priority to Japanese Patent Application No. 2016-231707, filed Nov. 29, 2016, the entire contents of each of which are incorporated herein by reference.

FIELD OF THE INVENTION

The present invention relates to a secondary battery.

BACKGROUND OF THE INVENTION

Conventionally, secondary batteries have been used as a power source for various electronic devices. Generally, a secondary battery has a structure in which an electrode assembly (electrode body) and an electrolyte are accommodated in an exterior body (case), and further has external terminals for achieving electrical connection of the secondary battery (for example, Patent Document 1).

In recent years, the thinning and downsizing of electronic devices have progressed, and the demand for thinning and miniaturization of secondary batteries is increasing accordingly. In addition, the secondary battery is generally used together with a board, for example, an electronic circuit board such as a printed board, a semiconductor board such as a silicon wafer, and a glass board such as a display panel. In particular, the protective circuit board is often used for the purpose of prevention of overcharging, overdischarge, overcurrent and the like in lithium ion secondary batteries.

For this reason, a technique has been reported in which a cutout portion is provided in a secondary battery and a board is disposed thereon (Patent Document 2). Specifically, as shown in FIG. 8A, for example, a secondary battery 500 has a shape with a cutout portion 508, and in the peripheral edge region thereof, seal portions 509a to 509f for holding an electrolyte or the like in an exterior body 506. Two external terminals 505 protruding toward the cutout portion 508 are disposed in the seal portions 509a and 509b adjacent to, for example, the cutout portion 508 among the seal portions. Further, the surface of the secondary battery 500 is formed of the exterior body 506. Generally, in the secondary battery 500, as shown in FIG. 8B, from the viewpoint of reducing the influence of the heat generation of the secondary battery 500, a board 600 is disposed in the cutout portion away from the peripheral edge portion (seal portions 509a, 509b) of the secondary battery 500 by a predetermined gap x. The seal portion is formed by heat sealing when the exterior body 506 is a flexible pouch made of, for example, a laminate film.

Patent Document 1: Japanese Patent Application Laid-Open No. 2015-518256

Patent Document 2: Japanese Patent Application Laid-Open No. 2016-506606

SUMMARY OF THE INVENTION

However, inventors of the present invention have found that the following problems occur to such a secondary battery 500.

There is a problem that since the secondary battery 500 and the board 600 disposed in the cutout portion are deviated from each other due to vibration or the like, the electrical connection between the secondary battery 500 and the board 600 is lost and/or the secondary battery 500 and the board 600 are mutually damaged.

Since the external terminal 505 is lengthened by the securing of the gap x, the impedance of the secondary battery increases, so that the influence of heat generation of the secondary battery cannot be sufficiently reduced.

Since the gap x is a dead space for the secondary battery, it has been disadvantageously reduces the thickness and the size, and increases the capacity of the secondary battery.

It is an object of the present invention to provide a secondary battery that prevents a mutual positional deviation between the secondary battery and the board disposed in a cutout portion due to vibration or the like.

Another object of the present invention is to provide a secondary battery that prevents a mutual positional deviation between the secondary battery and the board disposed in a cutout portion due to vibration or the like, and whose impedance is sufficiently reduced and that achieves a reduction in thickness (miniaturization) and an increase in capacity of the secondary battery.

The present invention relates to a secondary battery including an electrode assembly including a positive electrode, a negative electrode, and a separator disposed between the positive electrode and the negative electrode, and an electrolyte encapsulated in an exterior body. The secondary battery/exterior body has a shape with a cutout portion in a planar view thereof. The secondary battery/exterior body has a seal portion along a peripheral edge portion thereof. The seal portion is folded in a thickness direction of the secondary battery to form a folded seal portion having an end of the folded seal portion is located on a cutout portion side of the seal portion so as to form a stopper portion for a board disposed in the cutout portion.

The secondary battery of the present invention prevents a mutual positional deviation between the secondary battery and the board disposed in a cutout portion due to a vibration or the like. As a result, electrical connection between the secondary battery and the board can be maintained, and mutual damage between the secondary battery and the board can be prevented.

BRIEF EXPLANATION OF THE DRAWINGS

FIG. 8A is a schematic plan view of a secondary battery according to the related art as viewed from its thickness direction.

FIG. 8B is a schematic plan view of a device showing the disposition of the secondary battery and the board in FIG. 8A.

DETAILED DESCRIPTION OF THE PREFERRED EMBODIMENTS OF THE INVENTION

Secondary Battery

Figure 1A:
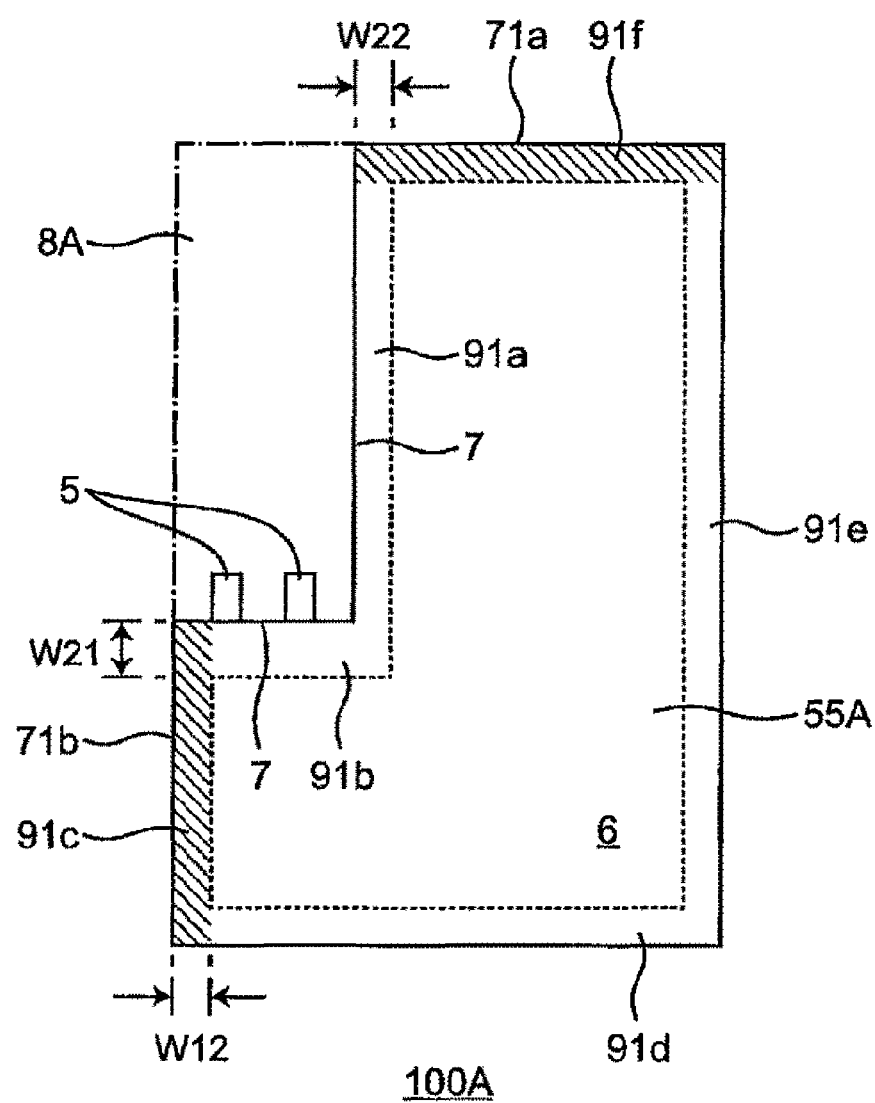
FIG. 1A is a schematic plan view of a secondary battery according to a first embodiment of the present invention as viewed from its thickness direction.

The present invention provides a secondary battery. In the present specification, the term "secondary battery" refers to a battery that can be repeatedly charged and discharged. "Secondary battery" is not excessively restricted to its name, and may include, for example, "electric storage device" and the like.

In the secondary battery of the present invention, an electrode assembly and an electrolyte, which will be described later, are enclosed in an exterior body, and a seal portion (sealing portion) for holding an electrolyte or the like inside the exterior body is formed along a peripheral edge portion thereof in a planar view. The planar view is a state when the secondary battery is placed and viewed from above in the thickness (height) direction, and is the same as a plan view. The placement is, for example, to place the secondary battery with the surface of the secondary battery having the largest area arranged as the bottom surface.

Hereinafter, the secondary battery of the present invention will be described in detail with reference to the drawings, but various elements in the drawings are merely shown schematically and exemplarily for the understanding of the present invention, and the appearance, dimensional ratio and the like may be different from the actual ones. "Vertical direction", "horizontal direction" and "front and rear direction" used directly or indirectly in this specification correspond to directions corresponding to the vertical direction, the horizontal direction, and the front and rear direction in the drawing, respectively. Unless otherwise specified, the same reference numerals or symbols shall indicate the same members or the same meaning.

As shown in FIGS. 1A, 2A, 3A, 4A, and 5A (hereinafter referred to as FIGS. 1A to 5A), the secondary battery of the present invention has a shape including a cutout portion 8 (including 8A, 8B, 8C, 8D, and 8E) in the planar view. The cutout portion is a portion intentionally removed from its initial quadrangular shape (for example, a rectangular shape). The rectangular shape includes a rectangle and a square, preferably a rectangle. The secondary battery before formation of the cutout portion is a secondary battery in a case where it is assumed that there is no cutout portion. FIGS. 1A to 5A are schematic plan views of an example of a secondary battery according to the present invention as viewed from the thickness direction thereof.

A boundary line 7 between a secondary battery 100 (including 100A, 100B, 100C, 100D, and 100E) and the cutout portion 8 may include one or more straight lines, one or more curves, or a combination thereof. For example, in FIG. 1A and FIG. 5A, the boundary line 7 includes two straight lines. For example, in FIG. 2A, the boundary line 7 includes one straight line. For example, in FIG. 3A, the boundary line 7 includes one straight line and one curve. For example, in FIG. 4A, the boundary line 7 includes three straight lines. The curve includes an arc-shaped curve, a parabolic curve, any other curves, and a curve in which these curves are connected continuously.

The disposition of the cutout portion 8 of the secondary battery may be appropriately selected according to the desired disposition of the board and is not particularly limited. For example, the cutout portion 8 may be disposed so as to share one or more and two or less sides with the secondary battery before formation of the cutout portion. In view of the balance between the miniaturization of the module including the secondary battery and the board and the increase in the capacity of the secondary battery, the cutout portion 8 is preferably disposed so as to share one or more and two or less sides, in particular two sides, with the secondary battery before formation of the cutout portion.

The disposition in which the cutout portion 8 shares two sides with the secondary battery before formation of the cutout portion means that the cutout portion 8 is disposed so as to have one corner portion shared with the secondary battery, which means that the cutout portion 8 has a shape including a corner portion in the secondary battery and is disposed in a corner. The shape of the cutout portion 8 is not particularly limited, but, includes for example, a quadrangular shape (especially rectangular shape) shown in FIGS. 1A and 5A, a triangular shape shown in FIG. 2A, and a substantially trapezoid shape shown in FIG. 3A.

The disposition in which the cutout portion 8 shares one side with the secondary battery before formation of the cutout portion means that the cutout portion 8 is disposed so as to have only one side shared with the secondary battery, which means that the cutout portion 8 has a shape that does not include a corner portion in the secondary battery and is disposed at the end. The shape of such cutout portion 8 is not particularly limited, but, includes, for example, a quadrangular shape (particularly rectangular shape) shown in FIG. 4A and the like can be cited.

The secondary battery 100 of the present invention has a line segment connecting with the boundary line 7 between the secondary battery 100 and the cutout portion 8 as a contour line constituting the planar view shape of the secondary battery 100. A line segment is a straight line between two points. The line segment connected to the boundary line 7 is a line segment connected to the boundary line 7 in the contour line in the planar view shape of the secondary battery 100, generally, a line segment connected to one end of the boundary line 7. The line segment connected to the boundary line 7 includes, for example, line segments 71a and 71b in FIG. 1A, line segments 72a and 72b in FIG. 2A, line segments 73a and 73b in FIG. 3A, line segments 74a and 74b in FIG. 4A, and line segments 75a and 75b in FIG. 5A.

In the present invention, a seal portion is formed on a peripheral edge portion (hereinafter, may be referred to as "peripheral edge portion I") including a line segment connected to the boundary line 7 as described above among the peripheral edge region (for example, the entire region of the peripheral edge portions 91a to 91f in FIG. 1A) in the planar view shape of the secondary battery. The peripheral edge portion (peripheral edge portion I) including the line segment connected to the boundary line 7 means a substantially quadrangular peripheral edge portion including a line segment connected to the boundary line 7 as one side in the peripheral edge region of the secondary battery 100 in the planar view shape. The quadrangular shape means a shape surrounded by four straight lines (line segments). If the peripheral edge portion I has a shape surrounded by a curve, the seal portion of the peripheral edge portion I cannot be effectively folded in the thickness direction of the secondary battery 100. Generally there are two peripheral edge portions I per secondary battery. Such a peripheral edge portion I includes for example, peripheral edge portions 91c and 91f (hatched area) in FIG. 1A, peripheral edge portions 94b and 94e (hatched area) in FIG. 2A, peripheral edge portions 95b and 95e (hatched area) in FIG. 3A, peripheral edge portions 96d and 96h (hatched area) in FIG. 4A, and peripheral edge portions 97c and 97f (hatched area) in FIG. 5A.

The fact that the seal portion is formed at the peripheral edge portion means that a seal (sealing) is achieved at a predetermined peripheral edge portion. The seal portion is generally provided on the outer peripheral edge of the exterior body so as to seal the electrode assembly and the electrolyte and the like inside the exterior body from the outside. The seal portion is formed by bonding the overlapping portion of the exterior body. In the case where the exterior body is formed from, for example, a laminate film, the seal portion is formed by heat sealing. In the present invention, such a seal portion only has to be formed at least one peripheral edge portion I of the two peripheral edge portions I. From the viewpoint of further preventing the positional deviation, it is preferable to form such a seal portion at both peripheral edge portions I. In the case where the seal portion is formed at one of the two peripheral edge portions I, the laminate film as an exterior body is generally folded back and used continuously in the other peripheral edge portion I. In the present invention, it is preferable to form the seal portion from the viewpoint of further preventing the positional deviation even at the peripheral edge portion I in which the laminate film is folded back continuously.

Even in the peripheral edge portion other than the peripheral edge portion I, a seal portion is generally formed as in the peripheral edge portion I. The seal portion does not necessarily have to be formed on all peripheral edge portions of the exterior body (secondary battery) as long as an electrolyte or the like is held inside the exterior body. For example, when the exterior body is formed of a laminate film and the laminate film is folded back at the peripheral edge portion and used continuously, the seal portion may not be formed at the peripheral edge portion.

In the present invention, the seal portion of the peripheral edge portion I can be folded in the thickness direction of the secondary battery 100, and more specifically, it can be folded so as to be substantially parallel to the thickness direction. Since an exterior body 6 is formed of a soft sheet, as described later, the folded seal portion may be bonded to a main body 55 (including 55A to 55E) of the secondary battery. In a case where the exterior body 6 is made of a plastic sheet, in particular, when the seal portion is folded in the thickness direction of the secondary battery 100, it maintains the shape as it is folded, so that bonding to the main body 55 is not necessarily required. As a result, as shown in FIGS. 1B, 2B, 3B, 4B and 5B (hereinafter referred to as FIGS. 1B to 5B), an end 51 (including 51a to 51i) on the cutout portion side at a folded seal portion 50 (including the 50a to 50i) (hereinafter may be referred to as "folded seal portion") is a stopper portion for a board 60 (including 60A to 60E) disposed in the cutout portion. That is, the folded seal portion 50 exerts a stopper action for preventing the positional deviation of the board 60 at the end 51 on the cutout portion side. Specifically, as shown in FIGS. 1B to 5B, the end 51 of the folded seal portion 50 on the cutout portion side protrudes toward the cutout portion 8. Therefore, the end 51 restricts the movement of the board 60 and exerts a stopper action. FIGS. 1B to 5B are schematic plan views of devices showing the disposition of the secondary battery and the board in FIGS. 1A to 5A, respectively.

Figure 7A:
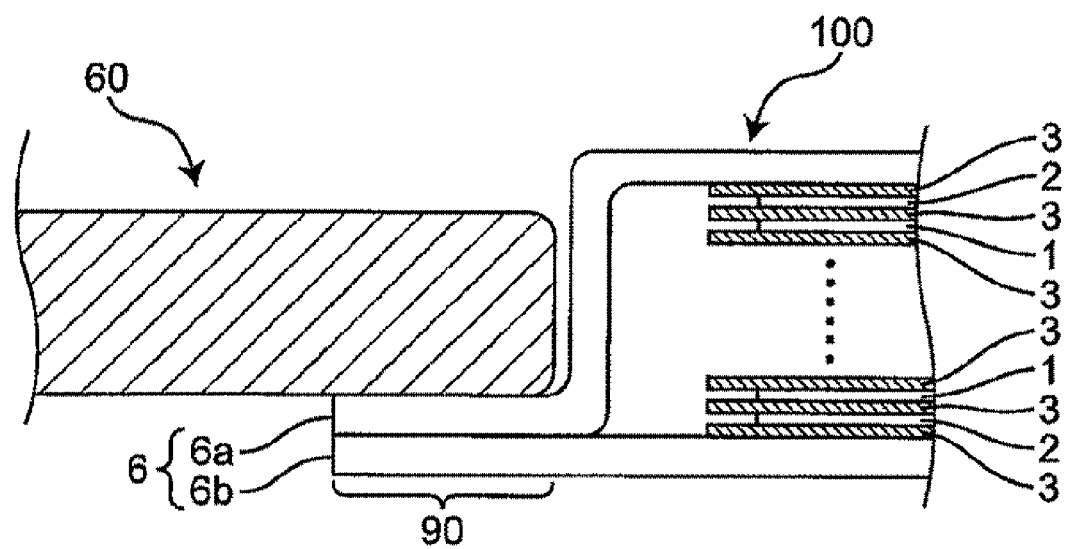
FIG. 7A is a schematic sectional view of a device for explaining an example of a vertical relationship between a secondary battery and a board and a structure of a secondary battery.
Figure 7B:
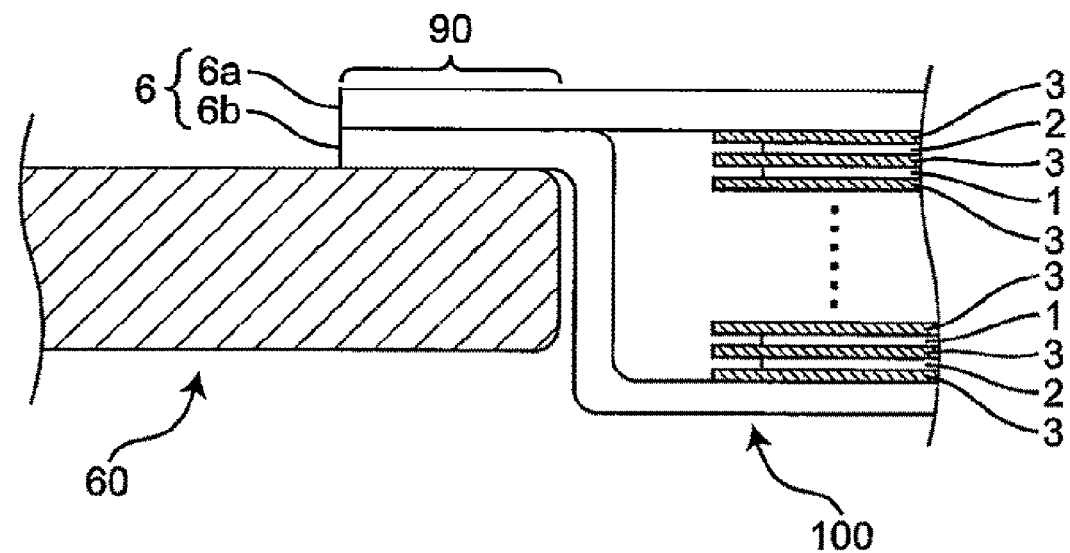
FIG. 7B is a schematic sectional view of a device for explaining an example of a vertical relationship between a secondary battery and a board and a structure of a secondary battery.

The folding direction is not particularly limited as long as a folded seal portion 50 exerts a stopper action at the end 51 on the cutout portion side. For example, in the case where the board 60 is disposed on a seal portion 90 of the secondary battery 100 as shown in FIG. 7A, which will be described later, the folding direction of the folded seal portion 50 is, the upward direction, for example, as shown in FIGS. 1F, 2F, 3F, and 4D described below. Further, for example, when the board 60 is disposed under the seal portion 90 of the secondary battery 100 as shown in FIG. 7B, which will be described later, the folding direction of the folded seal portion 50 is the downward direction.

In the present invention, as shown in FIG. 1B, FIG. 2B, FIG. 3B and FIG. 4B, for example, both of the seal portions of the two peripheral edge portions I are folded in the thickness direction of the secondary battery 100, but the present invention is not limited to this. For example, as shown in FIG. 5B, only one seal portion may be folded in the thickness direction of the secondary battery 100. In FIG. 5B, since an external terminal is provided in the seal portion of the peripheral edge portion I (97c) shown in FIG. 5A, only the seal portion of the peripheral edge portion I (97f) is folded in the thickness direction of the secondary battery 100. From the viewpoint of further preventing the positional deviation, it is preferable that both of the seal portions of the two peripheral edge portions I be folded in the thickness direction of the secondary battery 100.

Figure 1B:
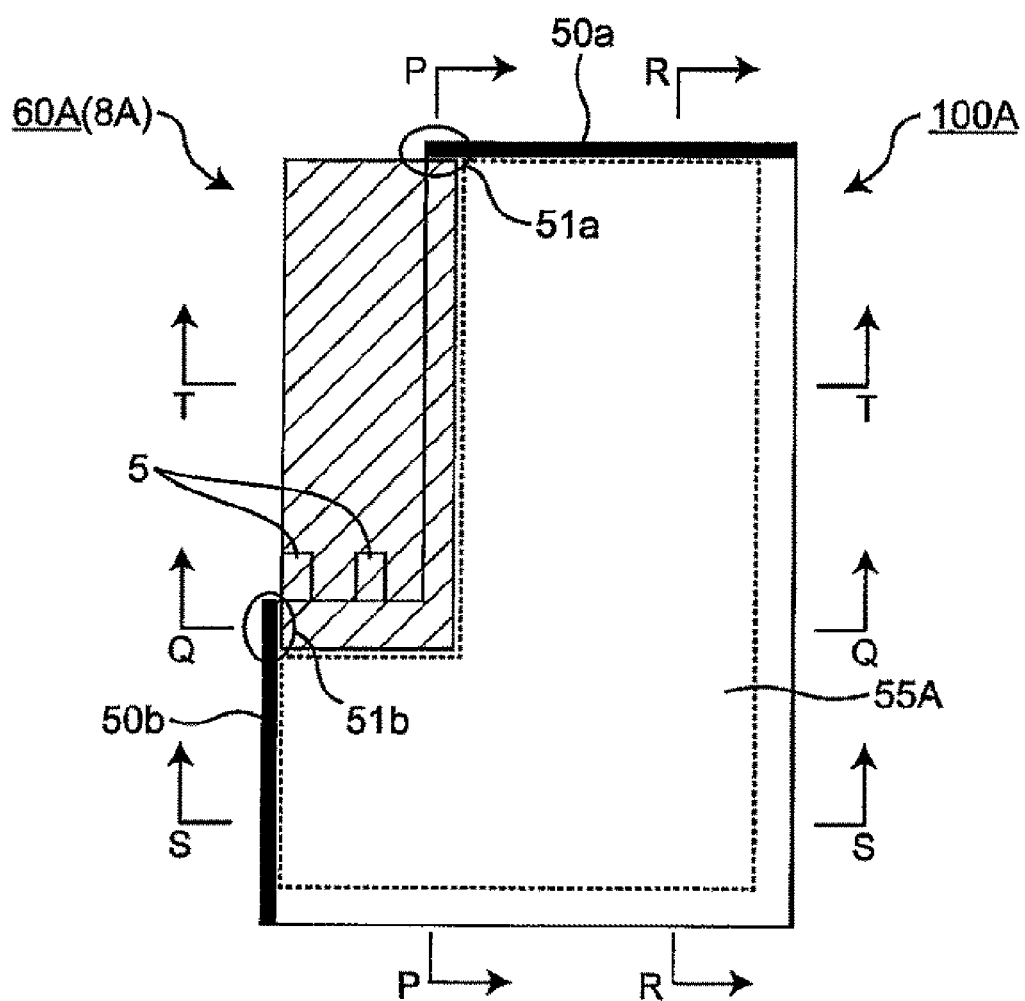
FIG. 1B is a schematic plan view of a device showing the disposition of the secondary battery and the board in FIG. 1A.
Figure 1C:
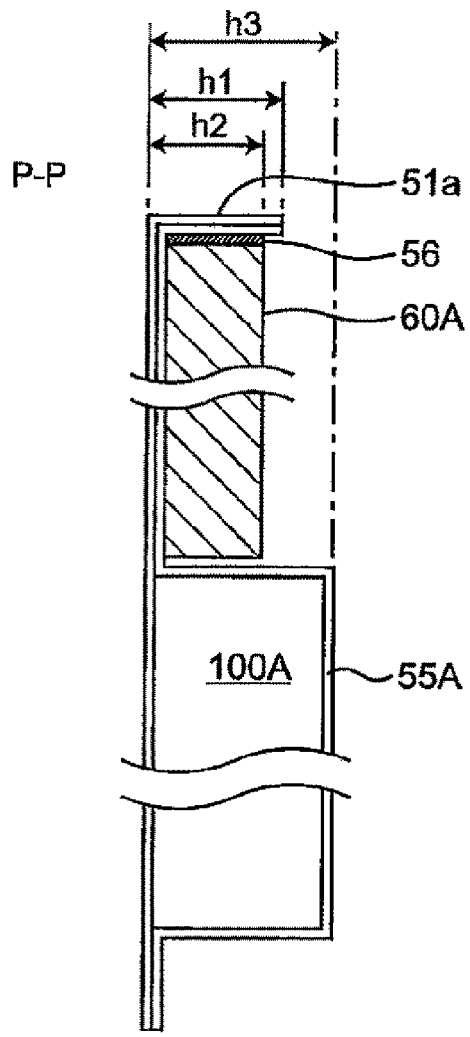
FIG. 1C is a schematic enlarged sectional view of the device when the P-P cross section of the device of FIG. 1B is viewed in the arrow direction.
Figure 1D:
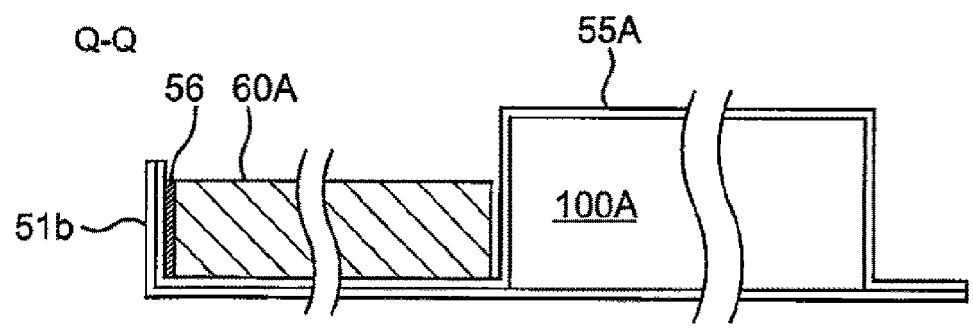
FIG. 1D is a schematic enlarged sectional view of the device when the Q-Q cross section of the device of FIG. 1B is viewed in the arrow direction.

Regarding the stopper action, specifically, as shown in FIGS. 1B and 1C, for example, a folded seal portion 50a prevents the positional deviation of the board 60A in the upward direction at the end 51a on the cutout portion side. As shown in FIGS. 1B and 1D, a folded seal portion 50b prevents the positional deviation of the board 60A in the left direction at the end 51b on the cutout portion side. FIGS. 1C and 1D are schematic enlarged sectional views of the device when the P-P cross section and the Q-Q cross section of the device of FIG. 1B are viewed in the arrow direction, respectively.

Figure 2A:
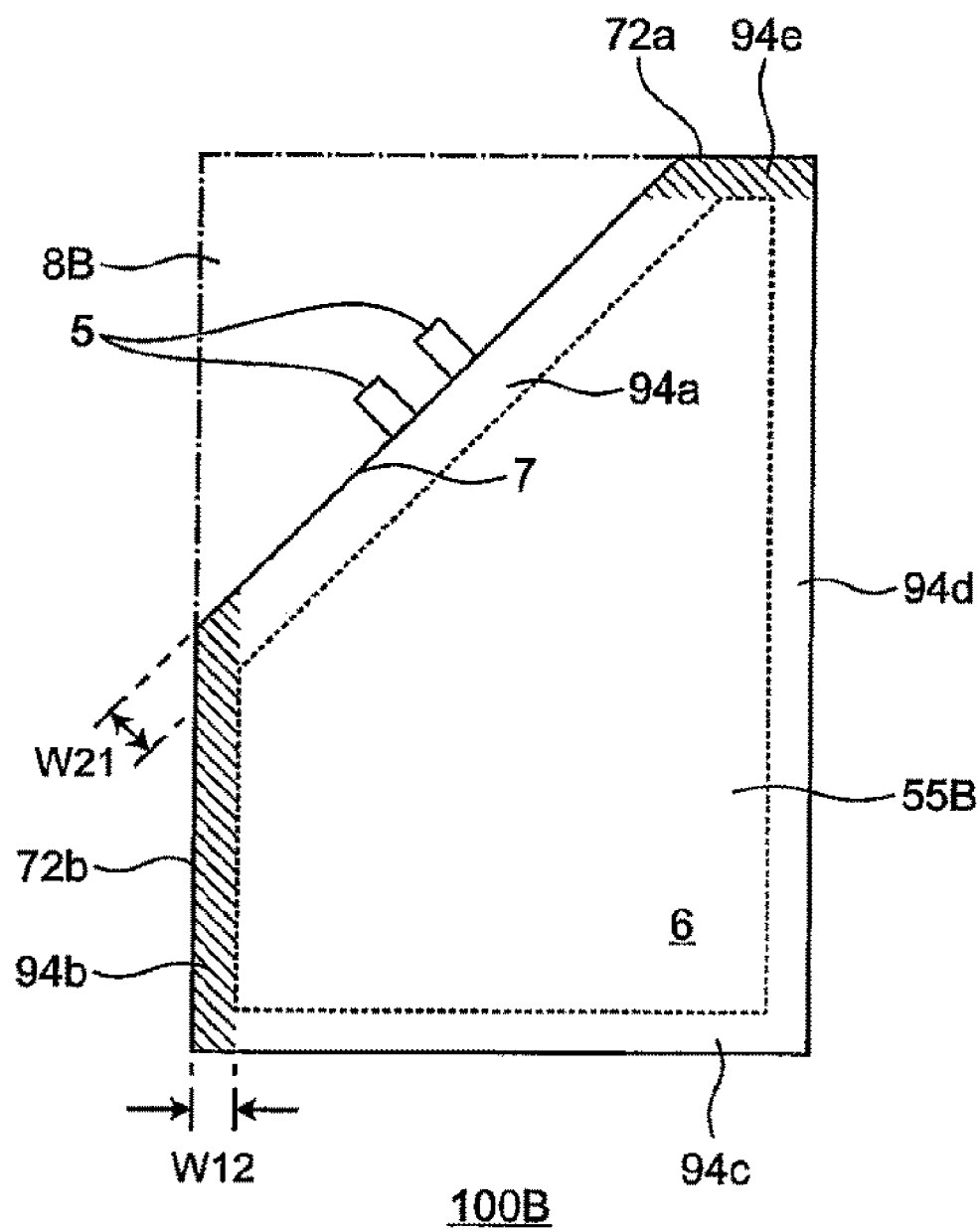
FIG. 2A is a schematic plan view of a secondary battery according to a second embodiment of the present invention as viewed from its thickness direction.
Figure 2B:
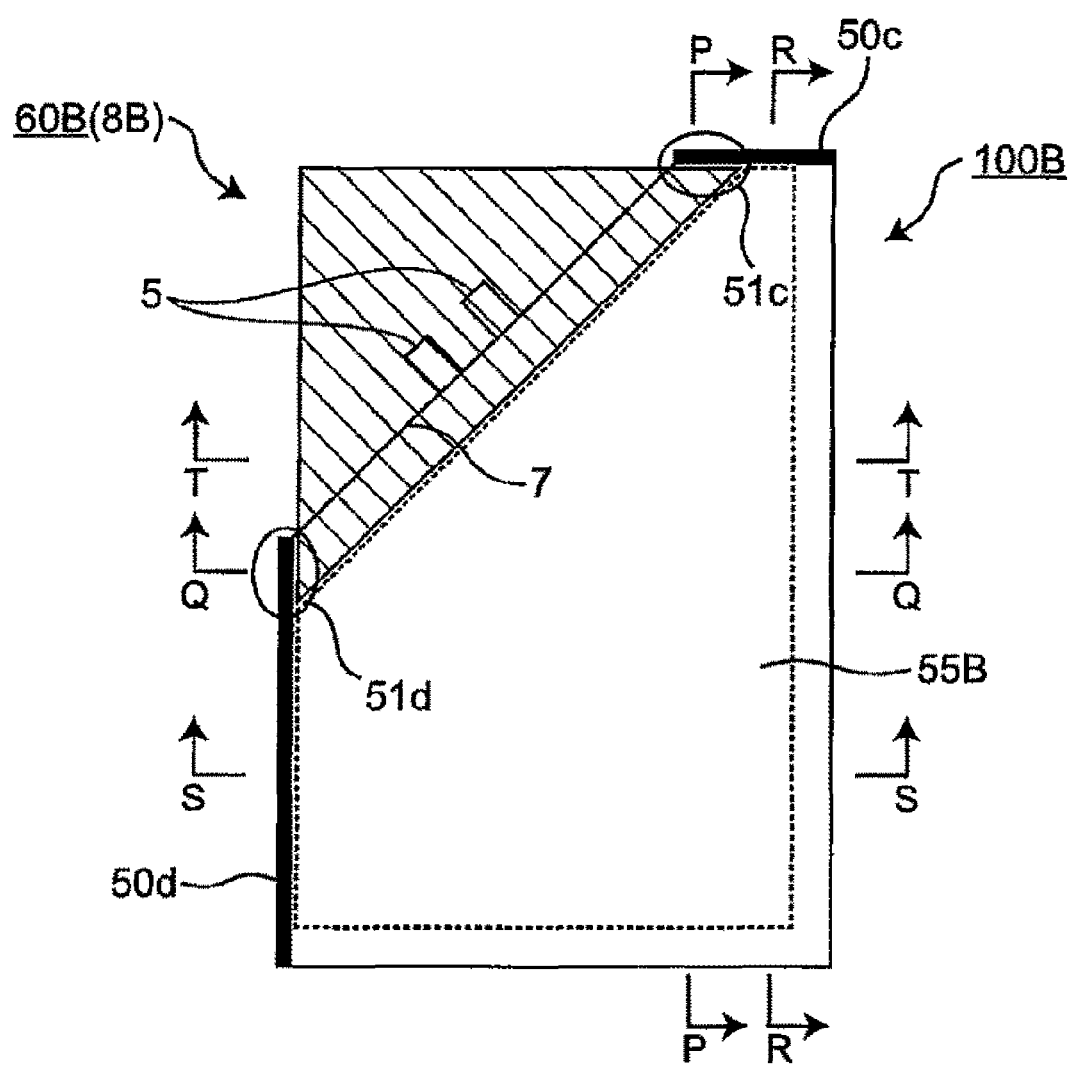
FIG. 2B is a schematic plan view of a device showing the disposition of the secondary battery and the board in FIG. 2A.
Figure 2C:
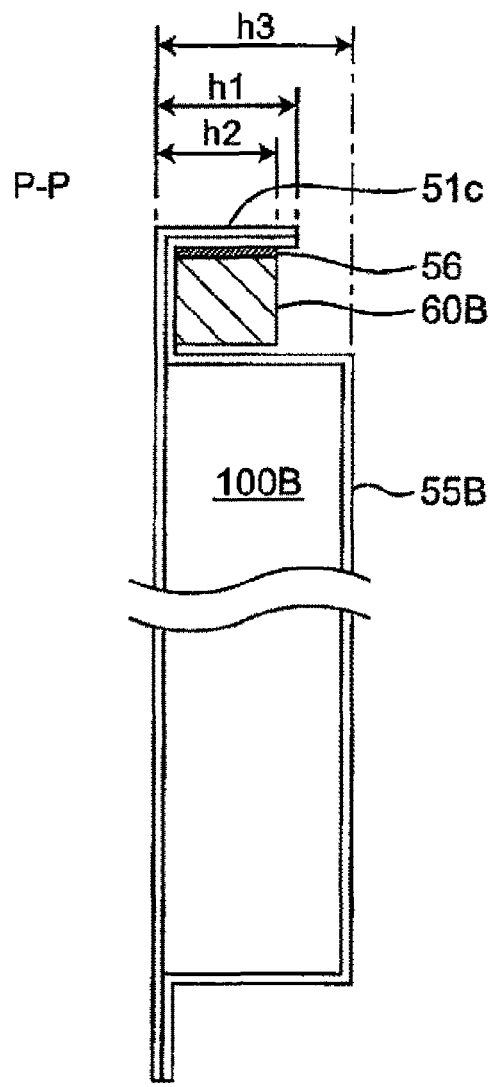
FIG. 2C is a schematic enlarged sectional view of the device when the P-P cross section of the device of FIG. 2B is viewed in the arrow direction.
Figure 2D:
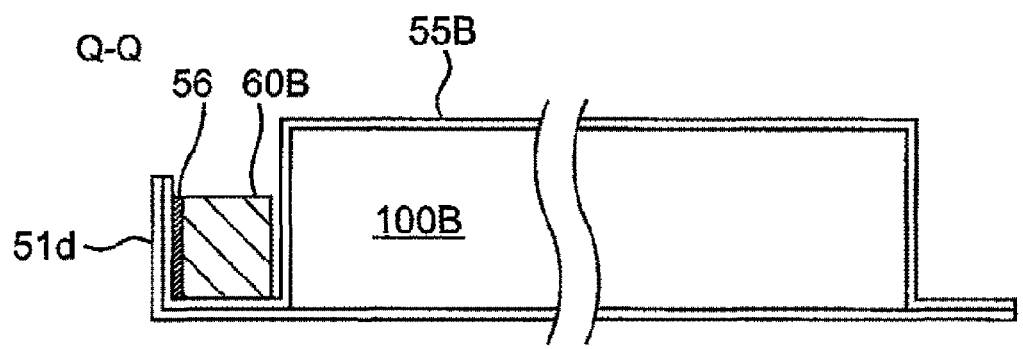
FIG. 2D is a schematic enlarged sectional view of the device when the Q-Q cross section of the device of FIG. 2B is viewed in the arrow direction.

Further, for example, as shown in FIGS. 2B and 2C, the folded seal portion 50c prevents the positional deviation of a board 60B in the upward direction at the end 51c on the cutout portion side. As shown in FIGS. 2B and 2D, the folded seal portion 50d prevents the positional deviation of the board 60B in the left direction at the end 51d on the cutout portion side. FIGS. 2C and 2D are schematic enlarged sectional views of the device when the P-P cross section and the Q-Q cross section of the device of FIG. 2B are viewed in the arrow direction, respectively.

Figure 3A:
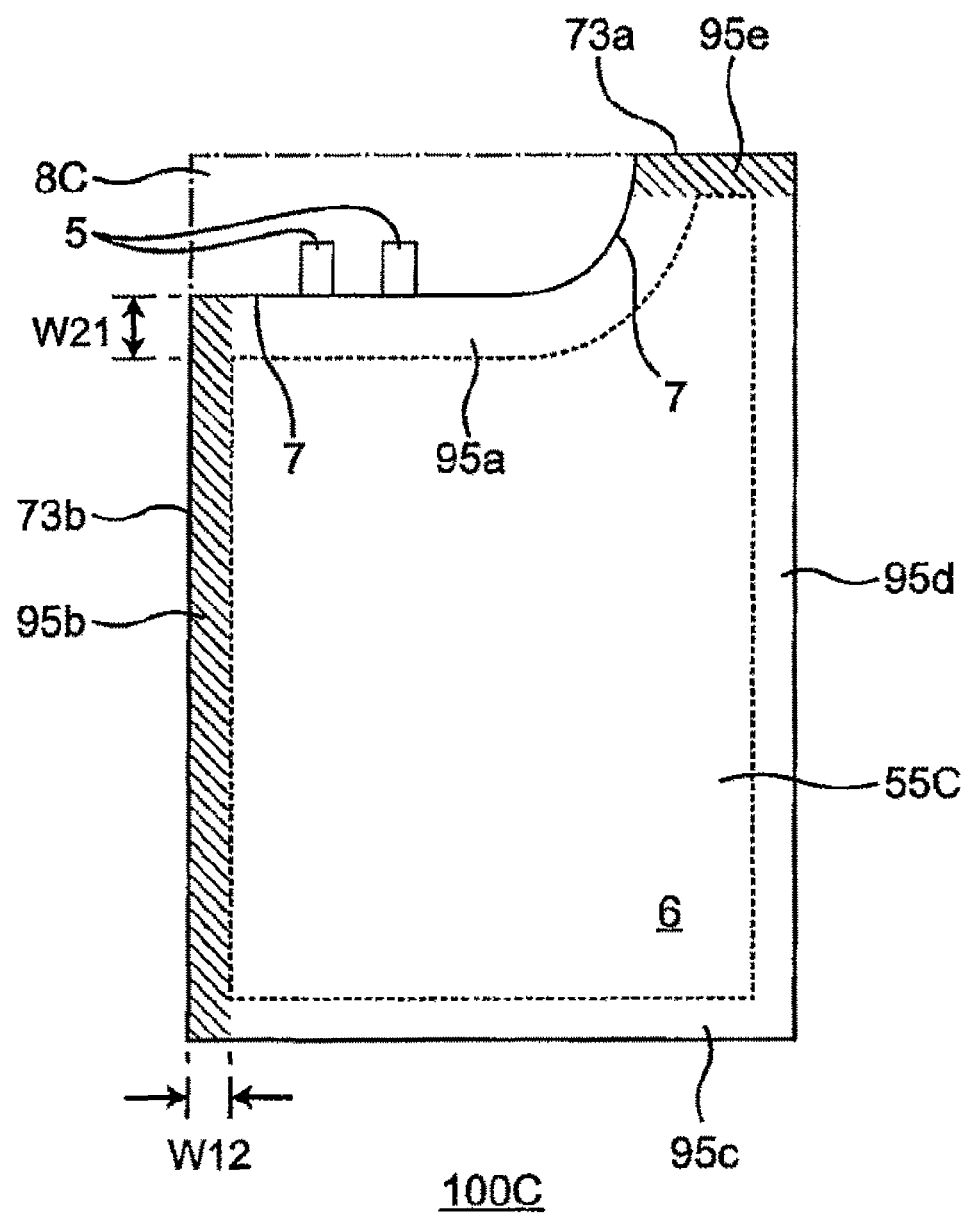
FIG. 3A is a schematic plan view of a secondary battery according to a third embodiment of the present invention as viewed from its thickness direction.
Figure 3B:
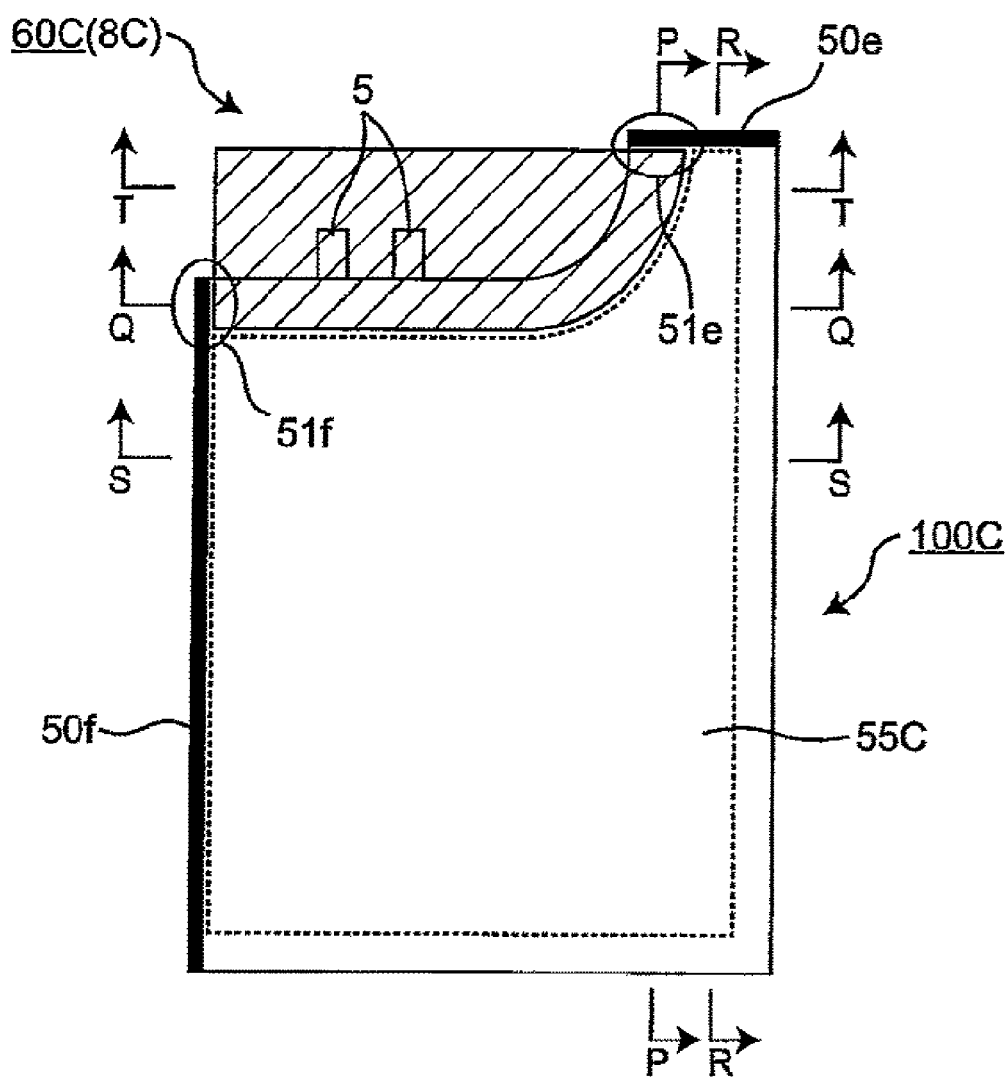
FIG. 3B is a schematic plan view of the device showing the disposition of the secondary battery and the board in FIG. 3A.
Figure 3C:
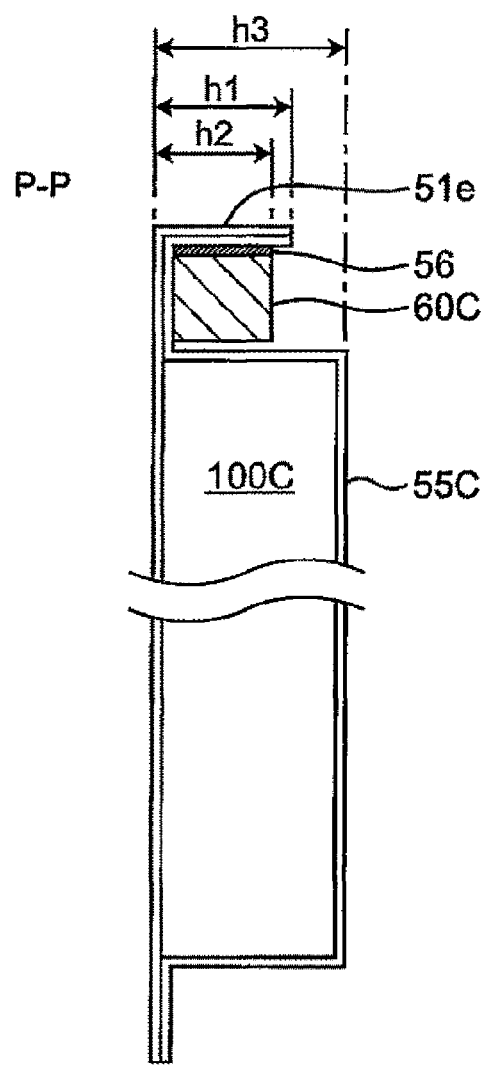
FIG. 3C is a schematic enlarged sectional view of the device when the P-P cross section of the device of FIG. 3B is viewed in the arrow direction.
Figure 3D:
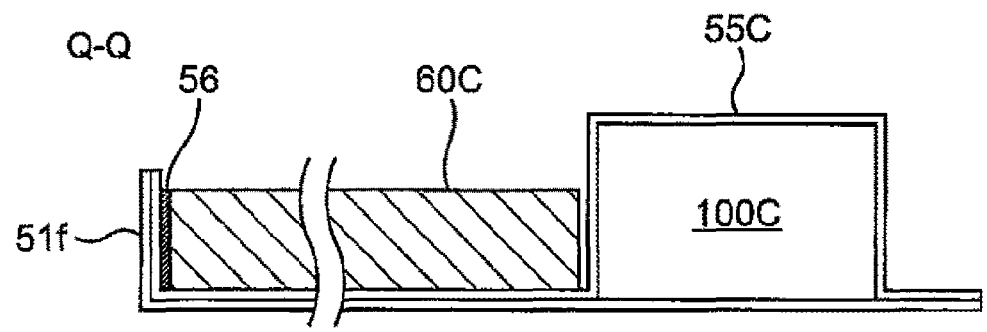
FIG. 3D is a schematic enlarged sectional view of the device when the Q-Q cross section of the device of FIG. 3B is viewed in the arrow direction.

Further, for example, as shown in FIGS. 3B and 3C, a folded seal portion 50e prevents the positional deviation of a board 60C in the upward direction at the end 51e on the cutout portion side. As shown in FIG. 3B and FIG. 3D, a folded seal portion 50f prevents the positional deviation of the board 60C in the left direction at the end 51f on the cutout portion side. FIGS. 3C and 3D are schematic enlarged sectional views of the device when the P-P cross section and the Q-Q cross section of the device of FIG. 3B are viewed in the arrow direction, respectively.

Figure 4A:
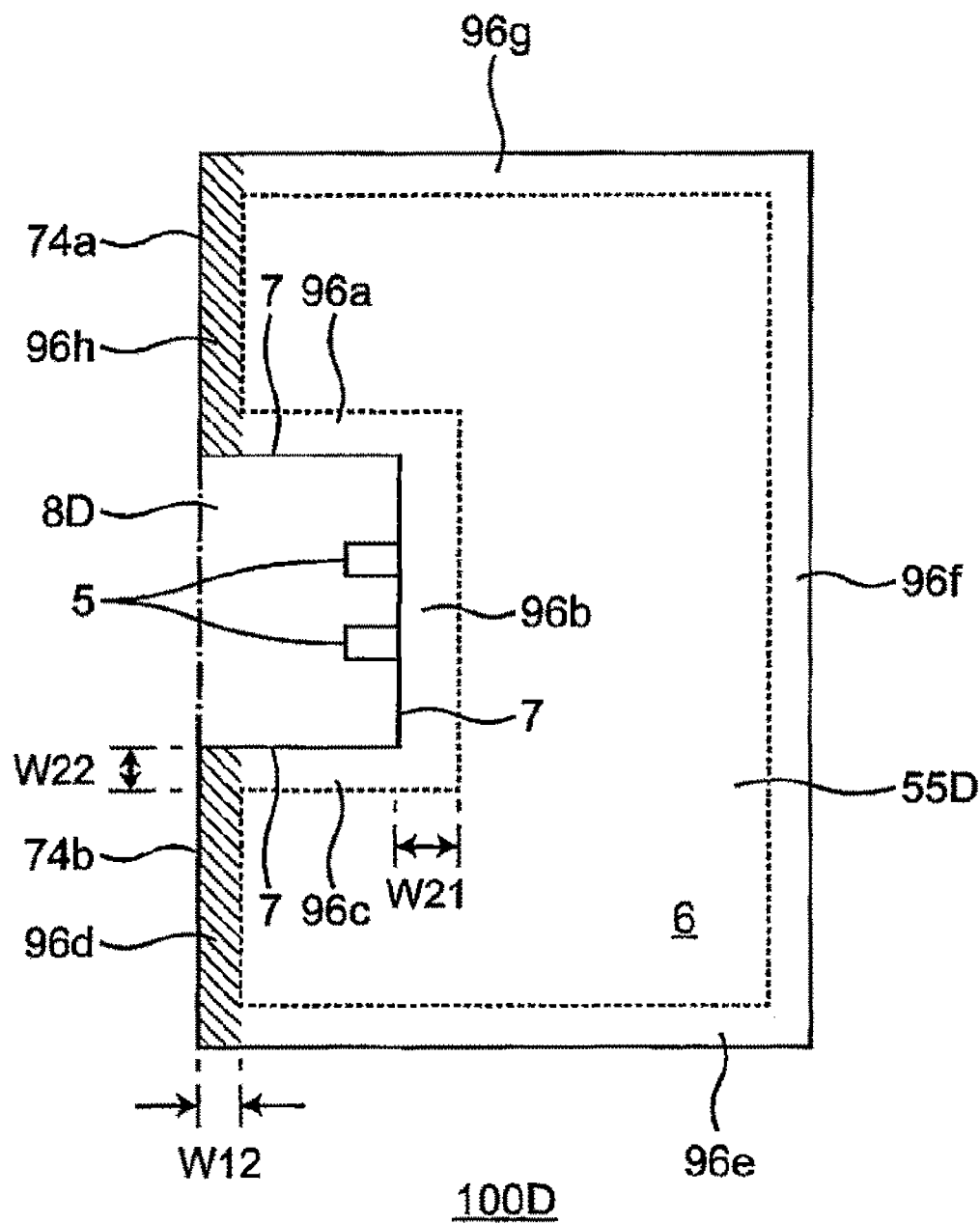
FIG. 4A is a schematic plan view of a secondary battery according to a fourth embodiment of the present invention as viewed from its thickness direction thereof.
Figure 4B:
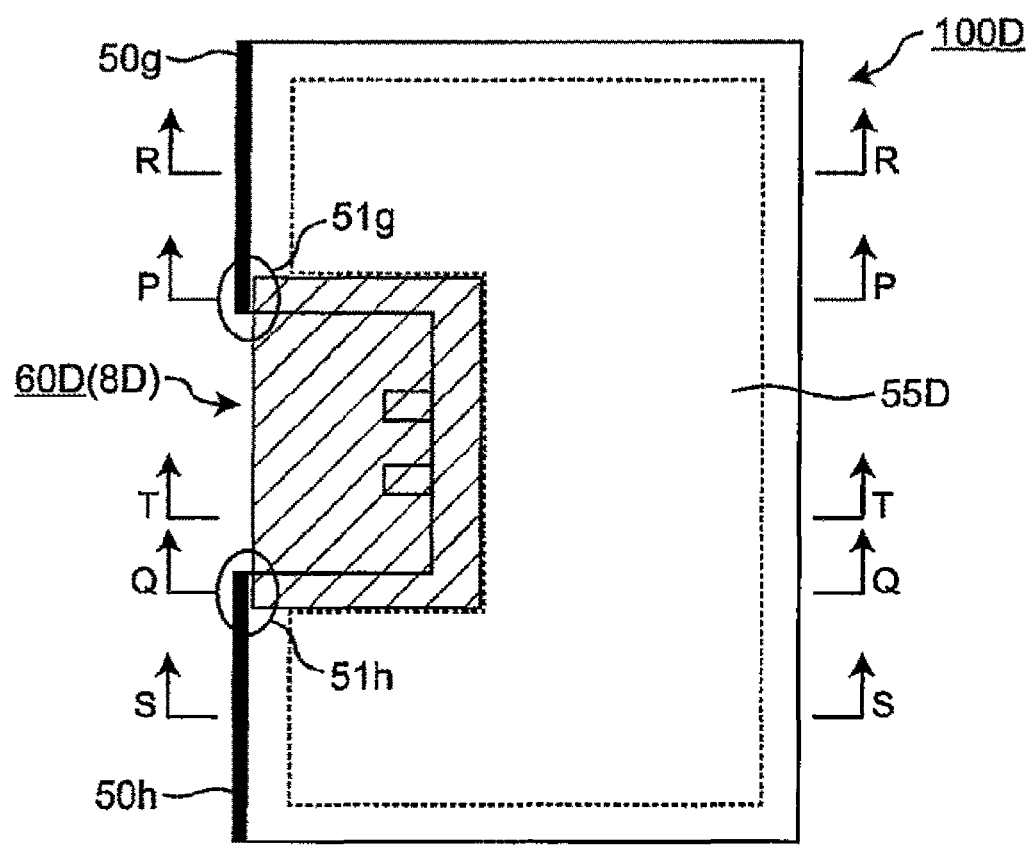
FIG. 4B is a schematic plan view of a device showing the disposition of the secondary battery and the board in FIG. 4A.
Figure 4C:
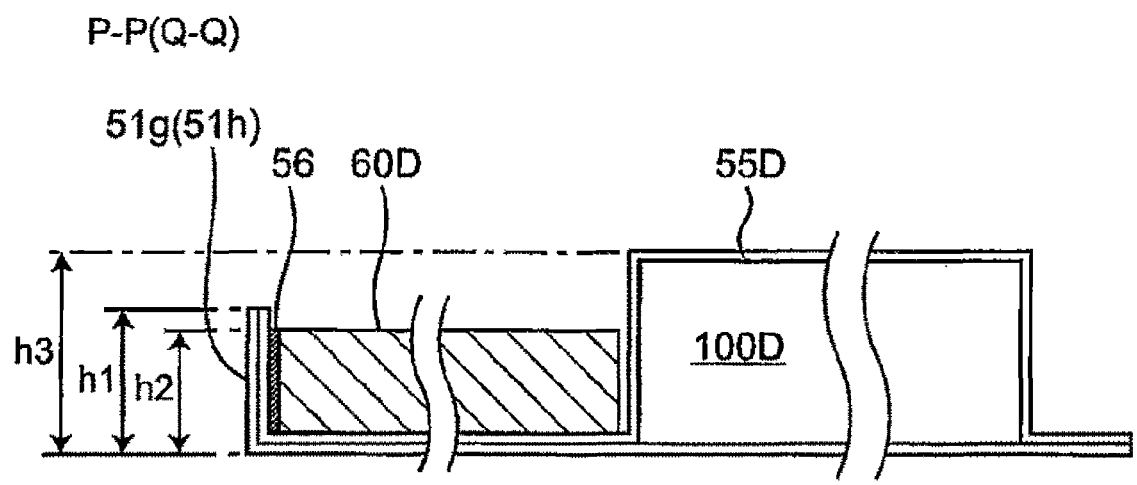
FIG. 4C is a schematic enlarged sectional view of the device when the P-P cross section and the Q-Q cross section of the device of FIG. 4B are viewed in the arrow direction.
Figure 5A:
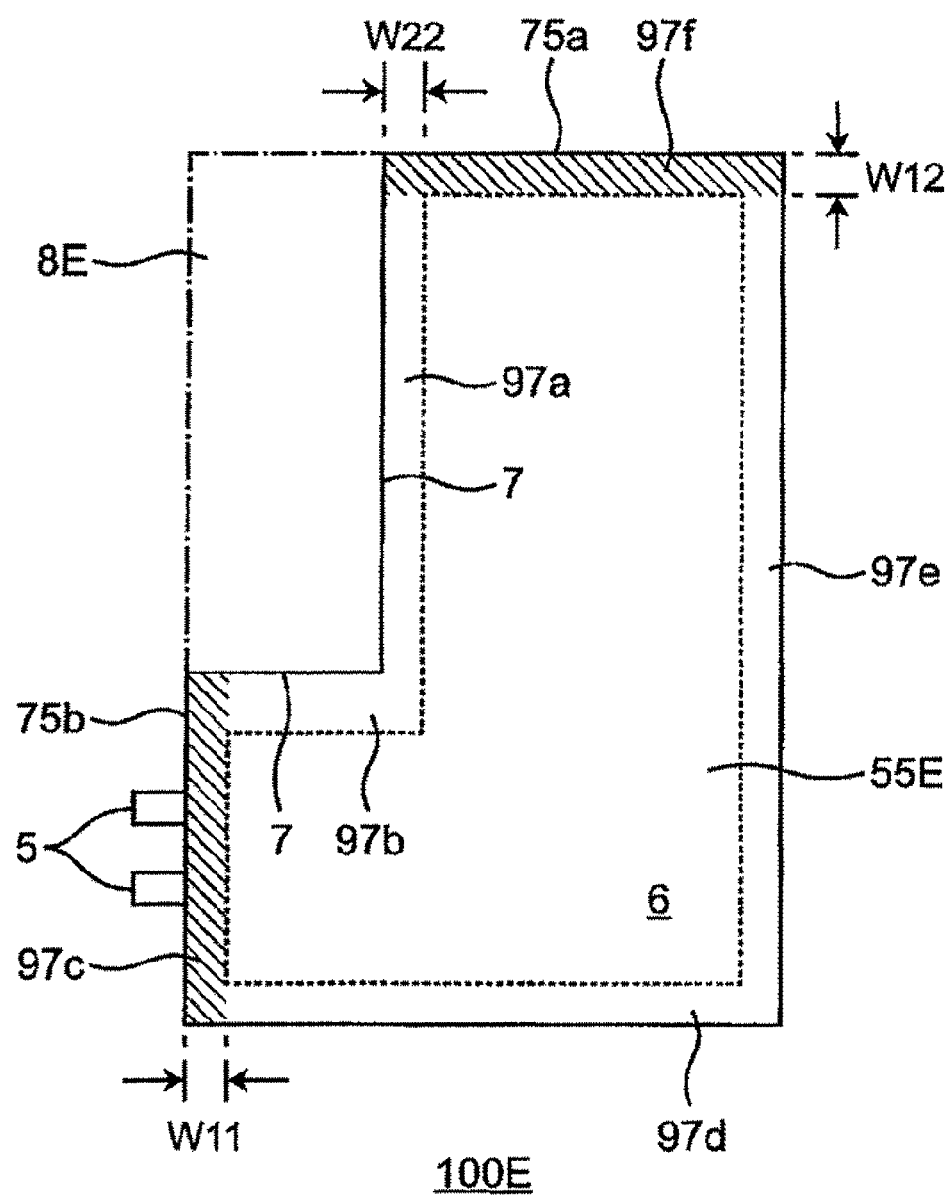
FIG. 5A is a schematic plan view of a secondary battery according to a fifth embodiment of the present invention as viewed from its thickness direction.
Figure 5B:
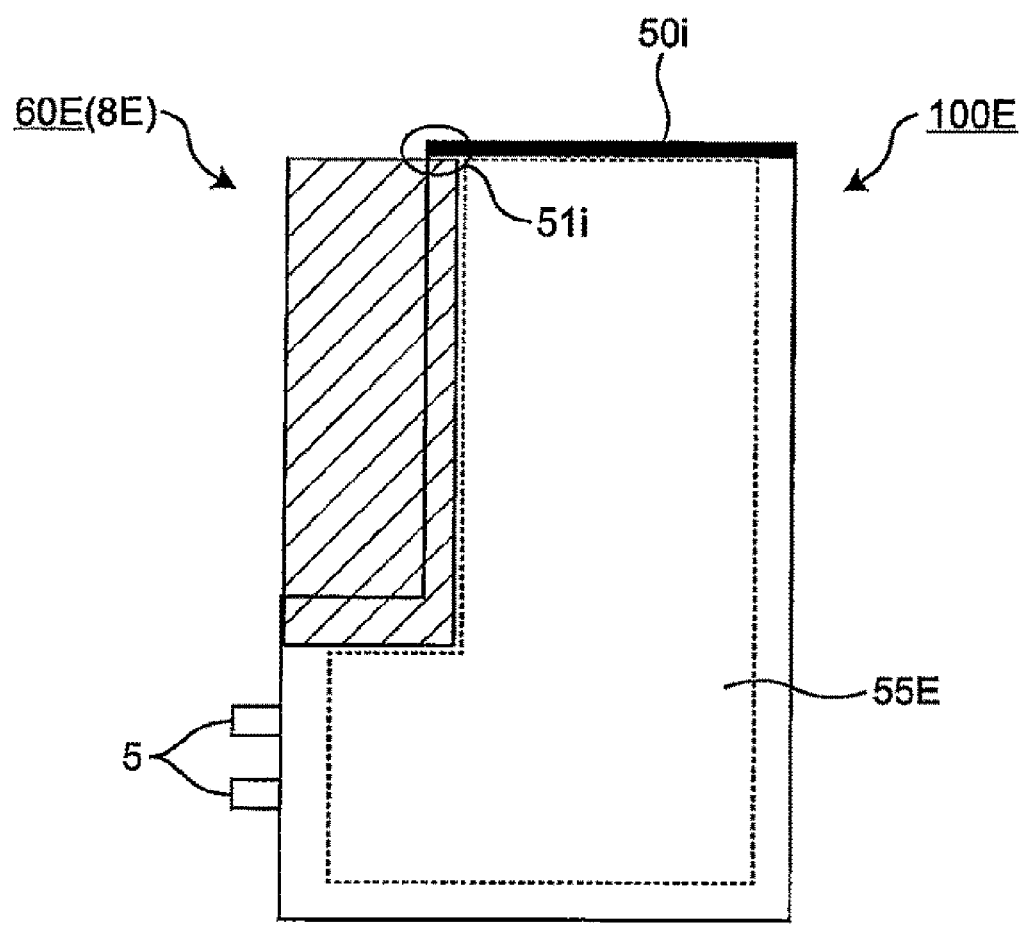
FIG. 5B is a schematic plan view of a device showing the disposition of the secondary battery and the board in FIG. 5A.

Further, for example, as shown in FIG. 4B and FIG. 4C, a folded seal portion 50g prevents the positional deviation of the board 60D in the left direction at the end 51g on the cutout portion side. A folded seal portion 50h prevents the positional deviation of the board 60D in the left direction at the end 51h on the cutout portion side in the same manner as the end 51g of the folded seal portion 50g on the cutout portion side. FIG. 4C is a schematic enlarged sectional view of the device when the P-P cross section (Q-Q cross section) of the device of FIG. 4B is viewed in the arrow direction.

For example, as shown in FIG. 5B, the folded seal portion 50i prevents the positional deviation of the board 60E in the upward direction at the end 51i on the cutout portion side.

The height h1 (mm) of the folded seal portion 50 (in particular, the end 51 on the cutout portion side) is not particularly limited as long as the height h1 (mm) exerts a stopper action against the positional deviation of the board at the end. For example, from the viewpoint of further preventing the positional deviation, the height h1 preferably satisfies the relational expression (1) in the relationship between the height h2 (mm) of the board 60 and the height h3 (mm) of the main body 55 of the secondary battery 100.

$$h3 \geq h1 \geq h2 \qquad (1)$$

The height h1 (mm) of the folded seal portion 50, the height h2 (mm) of the board 60, and the height h3 (mm) of the main body 55 are the heights from the bottom surface to the upper end (tip) of each member, when the secondary battery is placed with the surface of the maximum area of the secondary battery as the bottom surface, for example, respective heights h1, h2 and h3 shown in FIGS. 1C, 2C, 3C and 4C (hereinafter referred to as FIGS. 1C to 4C).

Figure 6A:
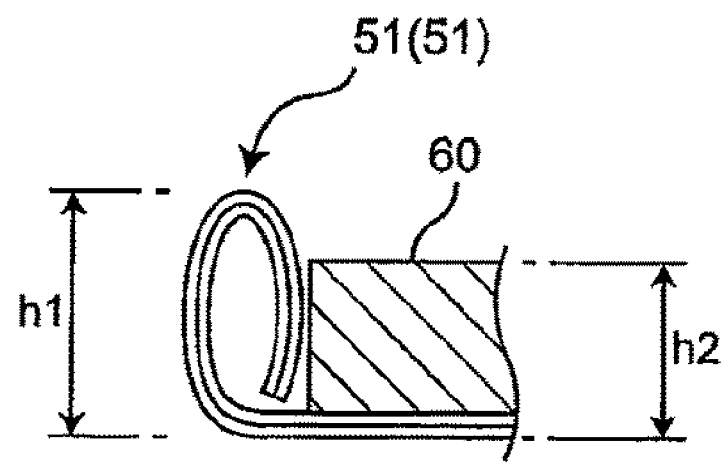
FIG. 6A is a schematic sectional view for explaining the folded shape of the folded seal portion and a height h1 of the folded seal portion and a height h2 of the board when the folded seal portion has the shape.
Figure 6B:
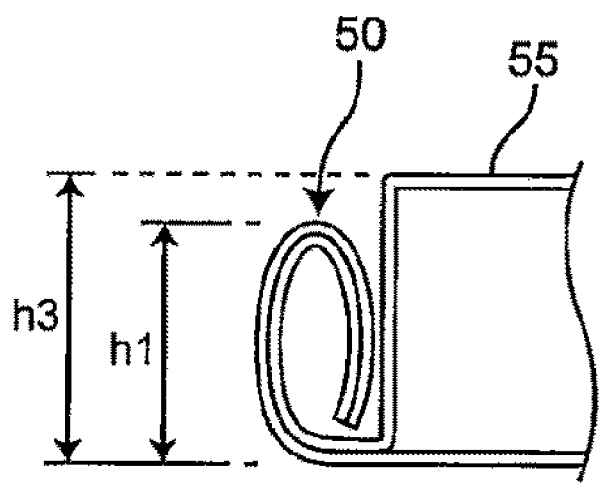
FIG. 6B is a schematic sectional view for explaining the folded shape of the folded seal portion and the height h1 of the folded seal portion and a height h3 of the secondary battery when the folded seal portion has the shape.

As shown in FIGS. 1C to 4C, for example, the folded seal portion 50 has a folded shape obtained by folding only once, but it is not limited thereto, and for example, as shown in FIGS. 6A and 6B, it may have a folded shape formed by folding once and further folding it once or more. The height h1 (mm) of the folded seal portion 50 (in particular, the end 51 on the cutout portion side), the height h2 (mm) of the board 60, and the height h3 (mm) of the secondary battery 100 when the folded seal portion 50 has the folded shape are shown in FIGS. 6A and 6B. FIG. 6A is a schematic sectional view of the folded seal portion 50, particularly the vicinity of the folded seal portion when the cutout portion side end 51 exerts a stopper action of the board. FIG. 6B is a schematic sectional view of the vicinity of the folded seal portion when the folded seal portion 50 is provided at the end of the secondary battery.

Figure 1E:
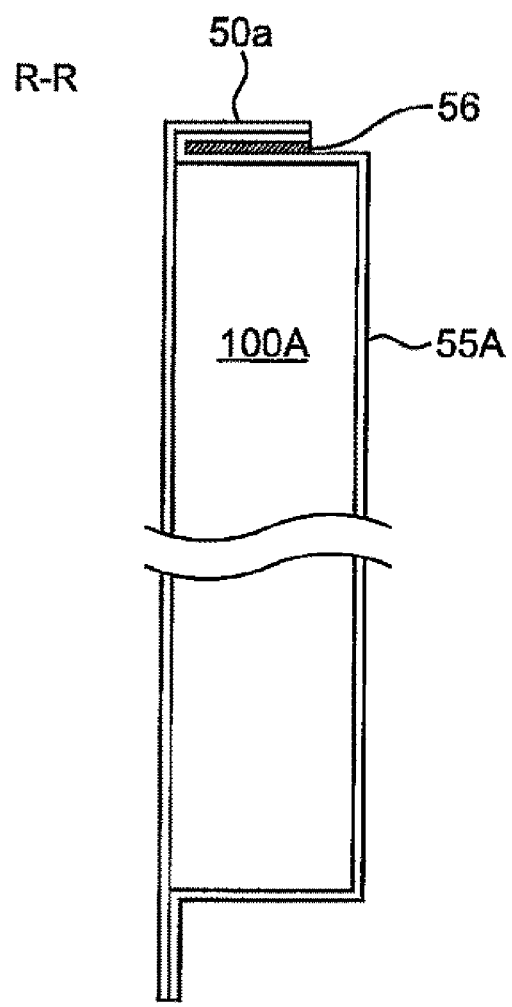
FIG. 1E is a schematic enlarged sectional view of the device when the R-R cross section of the device of FIG. 1B is viewed in the arrow direction.
Figure 1F:
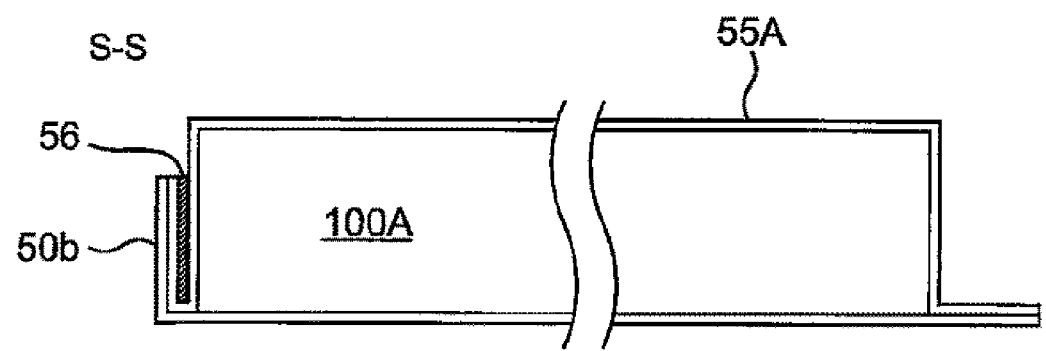
FIG. 1F is a schematic enlarged sectional view of the device when the S-S cross section of the device of FIG. 1B is viewed in the arrow direction.
Figure 1G:
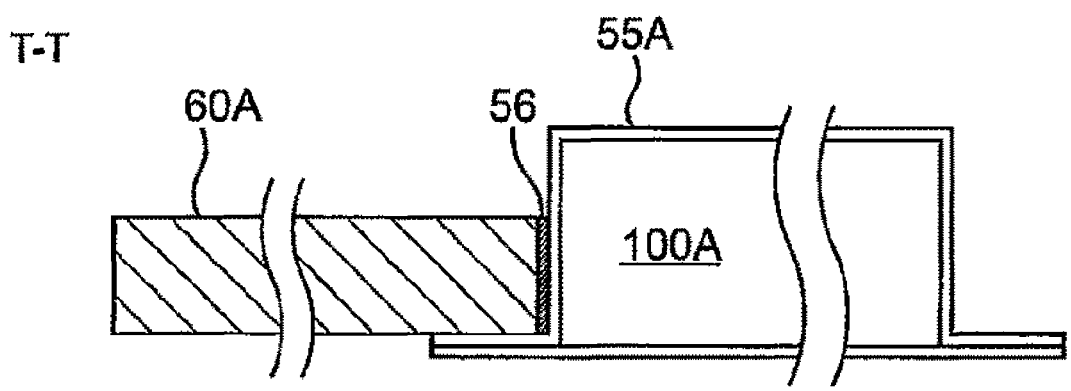
FIG. 1G is a schematic enlarged sectional view of the device when the T-T cross section of the device of FIG. 1B is viewed in the arrow direction.
Figure 2E:
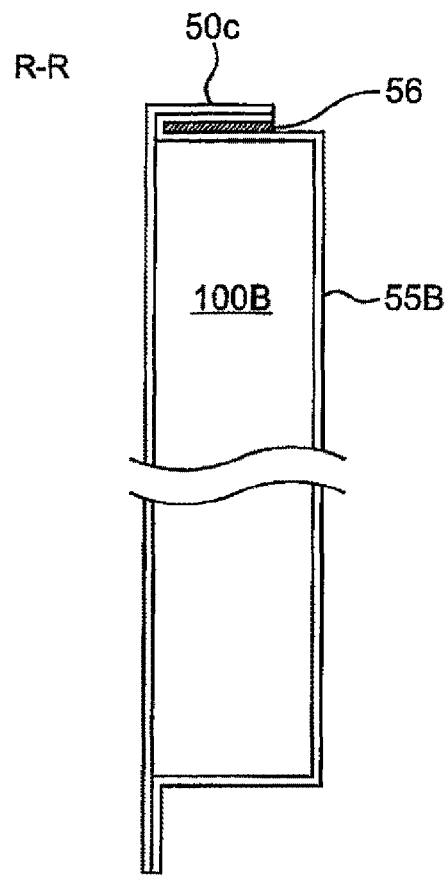
FIG. 2E is a schematic enlarged sectional view of the device when the R-R cross section of the device of FIG. 2B is viewed in the arrow direction.
Figure 2F:
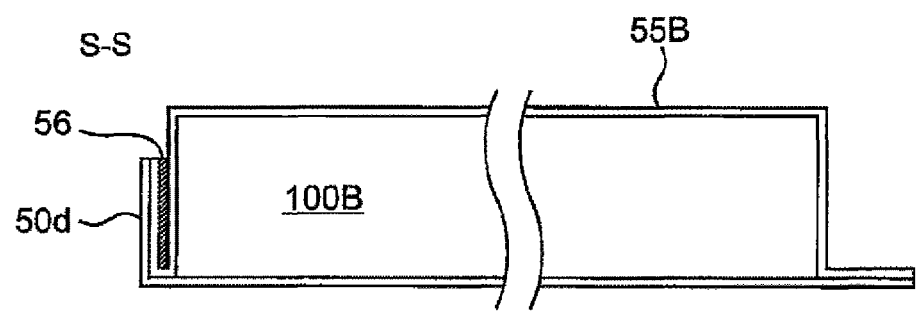
FIG. 2F is a schematic enlarged sectional view of the device when the S-S cross section of the device of FIG. 2B is viewed in the arrow direction.
Figure 2G:
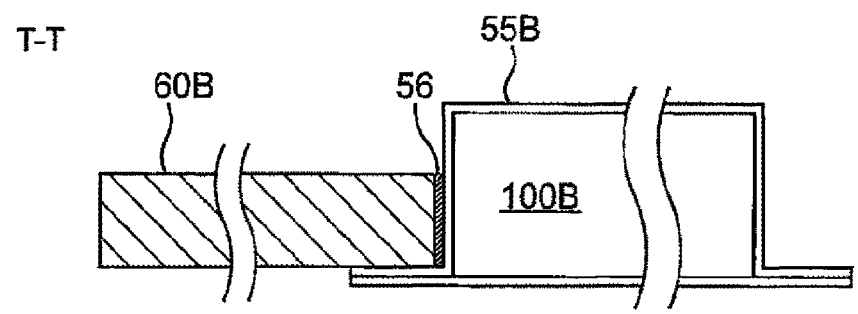
FIG. 2G is a schematic enlarged sectional view of the device when the T-T cross section of the device of FIG. 2B is viewed in the arrow direction.
Figure 3E:
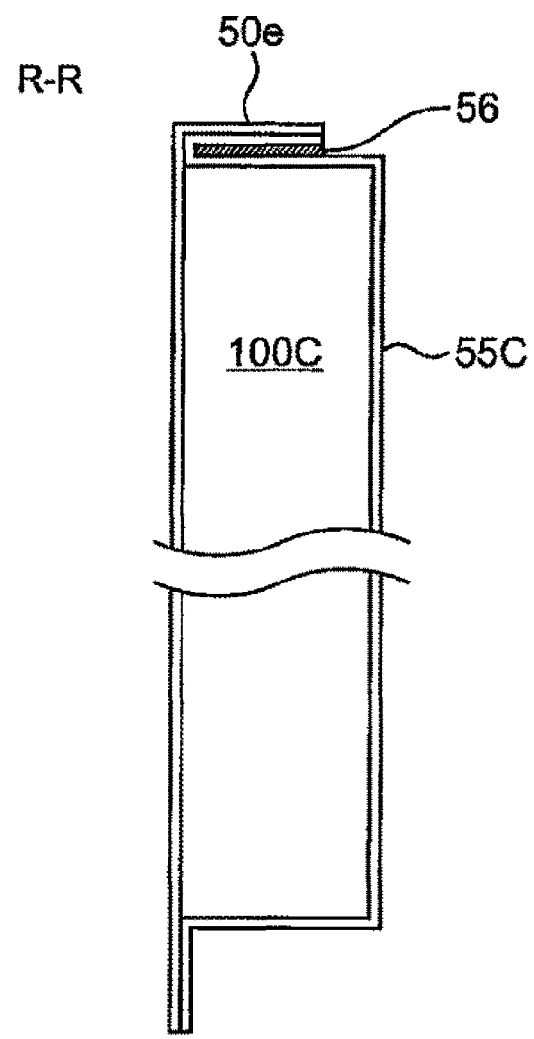
FIG. 3E is a schematic enlarged sectional view of the device when the R-R cross section of the device of FIG. 3B is viewed in the arrow direction.
Figure 3F:
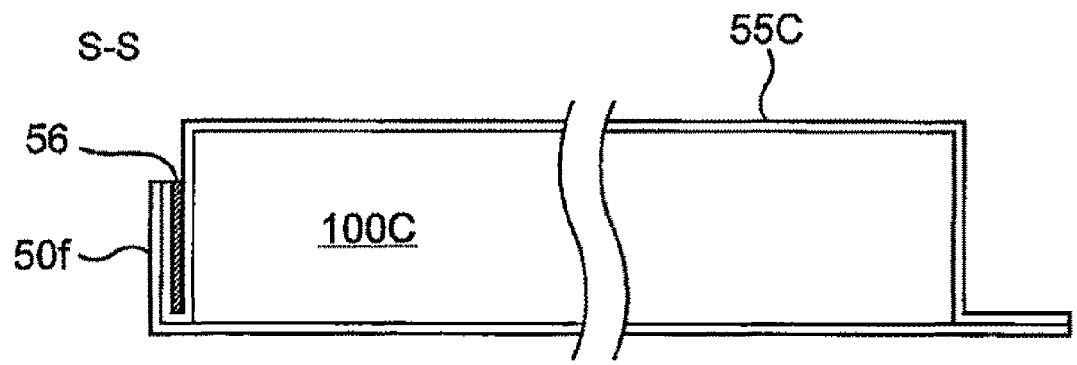
FIG. 3F is a schematic enlarged sectional view of the device when the S-S cross section of the device of FIG. 3B is viewed in the arrow direction.
Figure 3G:
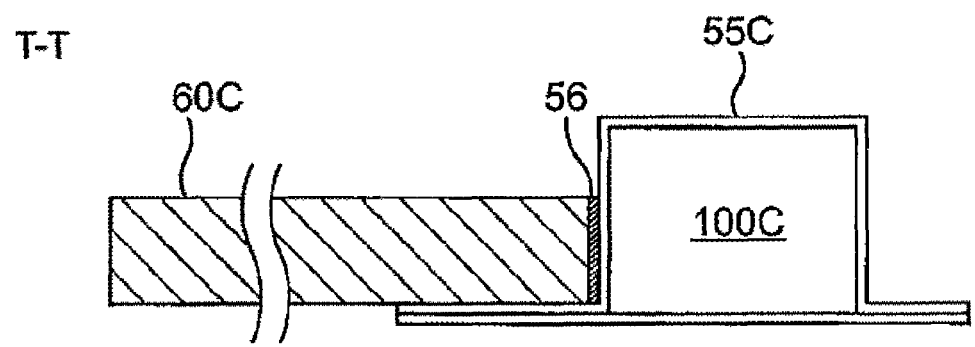
FIG. 3G is a schematic enlarged sectional view of the device when the T-T cross section of the device of FIG. 3B is viewed in the arrow direction.
Figure 4D:
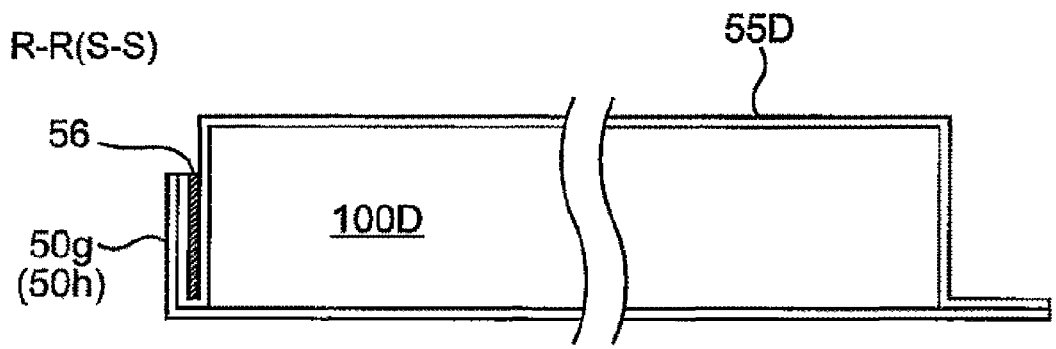
FIG. 4D is a schematic enlarged sectional view of the device when the R-R cross section and the S-S cross section of the device of FIG. 4B are viewed in the arrow direction.
Figure 4E:
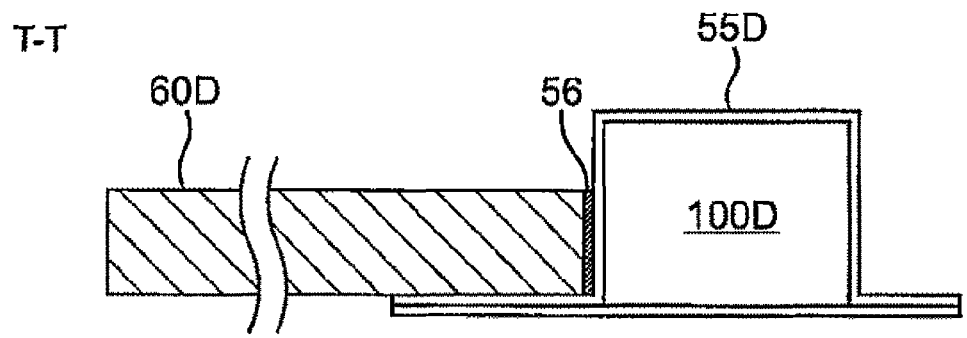
FIG. 4E is a schematic enlarged sectional view of the device when the T-T cross section of the device of FIG. 4B is viewed in the arrow direction.

The folded seal portion 50 may not be bonded to the main body 55 of the secondary battery, but from the viewpoint of further preventing the positional deviation, the folded seal portion 50 is preferably, at least in part, bonded to the main body 55 by a bonding means such as an adhesive, an adhesive tape or the like, for example, as shown in FIGS. 1E, 1F, 2E, 2F, 3E, 3F and 4D. In these figures, an adhesive 56 is used as a bonding means. FIGS. 1E and 1F are schematic enlarged sectional views of the device when the R-R cross section and the S-S cross section of the device of FIG. 1B are viewed in the arrow direction, respectively. FIGS. 2E and 2F are schematic enlarged sectional views of the device when the R-R cross section and the S-S cross section of the device of FIG. 2B are viewed in the arrow direction, respectively. FIGS. 3E and 3F are schematic enlarged sectional views of the device when the R-R cross section and the S-S cross section of the device of FIG. 3B are viewed in the arrow direction, respectively. FIG. 4D is a schematic enlarged sectional view of the device when the R-R cross section (S-S cross section) of the device of FIG. 4B is viewed in the arrow direction.

The end 51 of the folded seal portion 50 on the cutout portion side may or may not be bonded to the board 60. However, from the viewpoint of further preventing the positional deviation, the end 51, at least in part, is preferably bonded to the board 60 as shown, for example, in FIGS. 1C, 1D, 2C, 2D, 3C, 3D and 4C. Also in these figures, the adhesive 56 is used as a bonding means.

From the viewpoint of further preventing the positional deviation, the secondary battery 100 of the present invention further includes an extension member (not shown) as a separate member on the cutout portion side relative to the cutout portion side end 51 of the folded seal portion 50). By having such an extension member, it is possible to more effectively prevent the positional deviation of the board. As the material constituting the extension member, any material can be used as long as it has strength enough to prevent the positional deviation of the board, and examples thereof include organic polymers such as polyolefin, polyester, polyamide, polyurethane, polyimide and the like. The extension member is a member that extends the folded seal portion toward the cutout portion, and a rod-shaped or plate-shaped member longer than a predetermined length is prepared and part thereof is inserted into between the folded seal portion 50 and the main body 55, and by bonding them, the extension member can be provided. As the bonding means, the bonding means described above can be used.

In the present invention, from the viewpoint of further preventing positional deviation, it is preferable that a seal portion is provided on the peripheral edge portion (hereinafter occasionally referred to as a "peripheral edge portion II") including the boundary line 7 between the secondary battery 100 and the cutout portion 8 in the peripheral edge region of the secondary battery in the planar view shape. The peripheral edge portion (peripheral edge portion II) including the boundary line 7 between the secondary battery 100 and the cutout portion 8 means a peripheral edge portion including the boundary line 7 as the contour line of the outer edge in the peripheral edge region of the secondary battery 100 in the planar view, in other words, a peripheral edge portion adjacent to the cutout portion 8 (boundary line 7). The peripheral edge portion II does not include a common region with the peripheral edge portion I. Such a peripheral edge portion II includes for example, the seal portions 91a and 91b in FIG. 1A, the seal portion 94a in FIG. 2A, the seal portion 95a in FIG. 3A, the seal portions 96a, 96b and 96c in FIG. 4A, and the seal portions 97a and 97b in FIG. 5A.

Although an external terminal 5 may protrude from any seal portion, it is preferable that the external terminal 5 be provided so as to protrude from the seal portion of the peripheral edge portion II toward the cutout portion. The secondary battery of the present invention has the external terminal at the seal portion of the peripheral edge portion II and the board is disposed at the cutout portion, whereby the external terminal can be shortened. Therefore, it is possible to reduce the impedance of the secondary battery and sufficiently prevent heat generation. The external terminal 5 includes an external terminal for a positive electrode and an external terminal for a negative electrode.

Regarding the seal portion of the peripheral edge portion other than a peripheral edge portion II, the width of the seal portion is not particularly limited as long as the exterior body 6 can hold the electrolyte and the like. A width w11 of the seal portion (for example, 97c in FIG. 5A) where the external terminal 5 protrudes in the peripheral edge portion other than the peripheral edge portion II is generally 0.8×h3 or more and 3×h3 or less, in particular, 1×h3 or more and 2×h3 or less with respect to the height (thickness) h3 (mm) of the secondary battery. A width w12 of the seal portion (for example, 91c to 91f in FIG. 1A, 94b to 94e in FIG. 2A, 95b to 95e in FIG. 3A, 96d to 96h in FIG. 4A, 97d to 97f in FIG. 5A) where the external terminal 5 does not protrude in the peripheral edge portion other than the peripheral edge portion II is generally 0.5×h3 or more and 2.5×h3 or less, in particular, 0.8×h3 or more and 1.5×h3 or less with respect to the height (thickness) h3 (mm) of the secondary battery. In particular, the width w12 of the seal portion (for example, 91c and 91f in FIG. 1A, 94b and 94e in FIG. 2A, 95b and 95e in FIG. 3A, 96d and 96h in FIG. 4A, 97f in FIG. 5A) where the external terminal 5 does not protrude in the peripheral edge portion I generally corresponds to the height h1 of the folded seal portion 50 (in particular, the end 51 on the cutout portion side).

Regarding the seal portion of the peripheral edge portion II, the width of the seal portion is determined from the viewpoint of prevention of positional deviation and sealability. A width w21 of the seal portion (for example, 91b in FIG. 1A, 94a in FIG. 2A, 95a in FIG. 3A, and 96b in FIG. 4A) where the external terminal 5 protrudes in the peripheral edge portion II is generally 3.5×h3 or more and 6.0×h3 or less, in particular, 4.0×h3 or more and 5.5×h3 or less with respect to the height (thickness) h3 (mm) of the secondary battery. A width w22 of the seal portion (for example, 91a in FIG. 1A, 96a and 96c in FIG. 4A, and 97a in FIG. 5A) where the external terminal 5 does not protrude in the peripheral edge portion II is generally 3.0×h3 or more and 5.5×h3 or less, in particular, 3.5×h3 or more and 5.0×h3 or less with respect to the height (thickness) h3 (mm) of the secondary battery. If the width of the seal portion of the peripheral edge portion II is too small, it is impossible to sufficiently prevent positional deviation.

Particularly when the seal portion of the peripheral edge portion II has an L shape (91a and 91b) as shown in FIG. 1A in the planar view, as shown in FIG. 1A, the two external terminals 5 (external terminal for a positive electrode and external terminal for a negative electrode) may both protrude from one straight portion (91b or 91a) of the L-shaped seal portion, or may each protrude from one straight portion (for example 91a) and the other straight portion (for example 91b) of the L-shaped seal portion.

In the present invention, it is preferable that the secondary battery is disposed such that at least part of the seal portion of the peripheral edge portion II, preferably the entire seal portion of the peripheral edge portion II, overlaps the end of the board. The fact that at least part of the seal portion of the peripheral edge portion II overlaps the end of the board means that when the disposed secondary battery and the disposed board are seen in planar perspective view, at least part of the seal portion of the peripheral edge portion II of the secondary battery and the end of the board overlap each other. For example, in FIGS. 1B to 5B, part of the seal portion of the peripheral edge portion II of the secondary battery 100 and the end of the board 60 overlap each other. As a result, the seal portion of the peripheral edge portion II prevents the positional deviation of the board 60 in the rear surface direction of the page of the figure. Further, since the external terminals can be shortened, the impedance of the secondary battery can be reduced and heat generation can be sufficiently prevented. Further, since the formation of the dead space for the secondary battery is avoided and the space can be effectively used, it is possible to achieve thinning and miniaturization of the secondary battery, and also to increase the battery capacity.

The ratio of the overlapping area in the seal portion of the peripheral edge portion II in which the board overlaps the seal portion is generally 50% or more, preferably 60% or more, more preferably 70% or more. The ratio of the overlapping area is the ratio of the overlapping area to the entire area of the seal portion of the peripheral edge portion II. The area of the common portion between the seal portion of the peripheral edge portion II and a seal portion other than the seal portion of the peripheral edge portion II (for example, the seal portion of the peripheral edge portion I) is not included in the area of the seal portion of the peripheral edge portion II.

The secondary battery 100 and the board 60 may be or may not be bonded to each other partly or wholly in the contact portion of them, but from the viewpoint of further preventing the positional deviation, it is preferable for them to be bonded to each other, for example, as shown in FIGS. 1G, 2G, 3G and 4E. In these figures, the adhesive 56 is used as a bonding means. In these figures, the main body 55 of the secondary battery 100 and the board 60 are bonded to each other, but instead of or in addition to this, bonding may be achieved between the seal portion of the secondary battery 100 and the board 60. FIGS. 1G, 2G, 3G, and 4E are schematic enlarged sectional views of the device when the T-T cross section of the device of FIGS. 1B to 4B is viewed in the arrow direction.

In FIGS. 1B to 5B, the overlap between the seal portion of the peripheral edge portion II and the secondary battery 100 with the board 60 is such that, as shown in FIG. 7A, the end of the board 60 is disposed on the seal portion 90 of the peripheral edge portion II. This overlap may be achieved by disposing the end of the board 60 underneath the adjacent seal portion 90, as shown in FIG. 7B. In FIGS. 7A and 7B, in the secondary battery 100, only one of an upper exterior member 6a and a lower exterior member 6b constituting the exterior body 6 is a cup molded body with a thickness, but the embodiment is not limited thereto. For example, according to the thickness (height) of the electrode assembly accommodated in the secondary battery 100, as shown in FIG. 7C, both the upper exterior member 6a and the lower exterior member 6b may be a cup molded body with a thickness.

Constituent Member of Secondary Battery

Figure 7C:
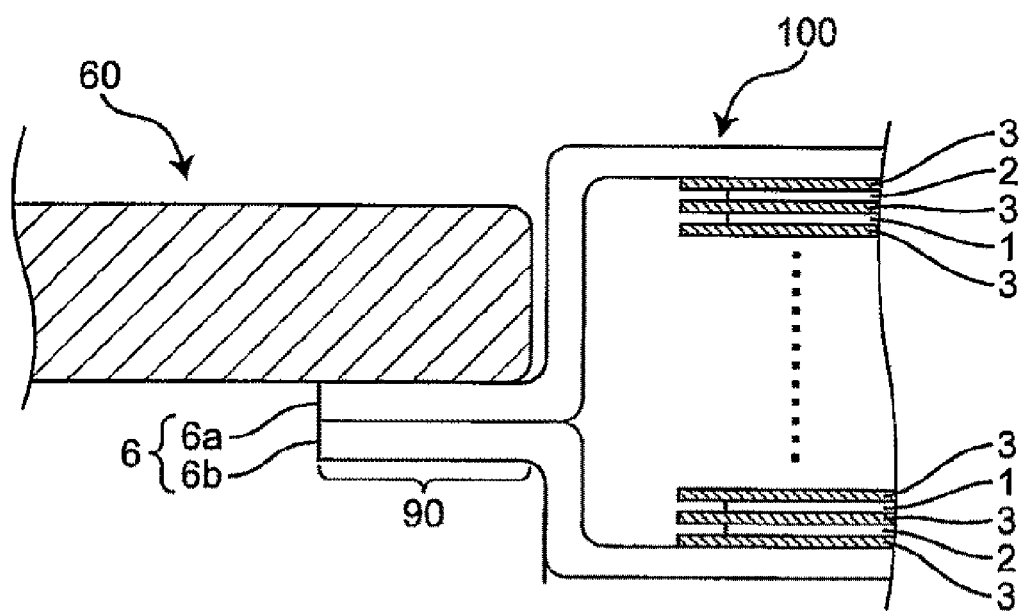
FIG. 7C is a schematic sectional view of a device for explaining an example of a vertical relationship between a secondary battery and a board and a structure of a secondary battery.

As shown in FIGS. 7A, 7B and 7C, for example, the electrode assembly includes a positive electrode 1, a negative electrode 2, and a separator 3, and the positive electrode 1 and the negative electrode 2 are alternately disposed with the separator 3 interposed therebetween. The two external terminals are generally connected to electrodes (positive electrode or negative electrode) via a current collecting lead, and as a result are led out from the seal portion to the outside. In these figures, the electrode assembly includes a planar lamination structure in which a plurality of electrode units (electrode constituting layers) including the positive electrode 1, the negative electrode 2, and the separator 3 disposed between the positive electrode 1 and the negative electrode 2 are laminated planarly. The structure of the electrode assembly is not limited to the planar lamination structure, and for example, the electrode assembly may have a rolled winding structure (jelly roll type) in which the electrode unit (electrode constituting layer) including the positive electrode 1, the negative electrode 2, and the separator 3 disposed between the positive electrode 1 and the negative electrode 2 is wound in a roll shape. Further, for example, the electrode assembly may have a stack-and-fold structure in which a positive electrode, a separator, and a negative electrode are laminated on a long film and then folded.

The positive electrode 1 is composed of at least a positive electrode material layer and a positive electrode current collector (foil), and it suffices that the positive electrode material layer is provided on at least one face of the positive electrode current collector. For example, in the positive electrode 1, the positive electrode material layer may be provided on both faces of the positive electrode current collector, or a positive electrode material layer may be provided on one face of the positive electrode current collector. From the viewpoint of further increasing the capacity of the secondary battery, in the positive electrode 1, the positive electrode material layer is preferably provided on both faces of the positive electrode current collector. The positive electrode material layer contains a positive electrode active substance.

The negative electrode 2 is composed of at least a negative electrode material layer and a negative electrode current collector (foil), and it suffices that the negative electrode material layer is provided on at least one face of the negative electrode current collector. For example, in the negative electrode 2, the negative electrode material layer may be provided on both faces of the negative electrode current collector, or the negative electrode material layer may be provided on one face of the negative electrode current collector. From the viewpoint of further increasing the capacity of the secondary battery, in the negative electrode 2, the negative electrode material layer is preferably provided on both faces of the negative electrode current collector. The negative electrode material layer contains a negative electrode active substance.

The positive electrode active substance contained in the positive electrode material layer and the negative electrode active substance contained in the negative electrode material layer are substances directly involved in the transfer of electrons in the secondary battery and are main substances of the positive and negative electrodes which are responsible for charging and discharging, that is, a cell reaction. More specifically, ions are generated in the electrolyte due to "the positive electrode active substance contained in the positive electrode material layer" and "the negative electrode active substance contained in the negative electrode material layer", and such ions are transferred between the positive electrode and the negative electrode to transfer electrons, resulting in charging and discharging. As will be described later, it is preferable that the positive electrode material layer and the negative electrode material layer be layers capable of storing and releasing lithium ions, in particular. That is, a secondary battery in which lithium ions move between a positive electrode and a negative electrode via an electrolyte to charge and discharge the battery is preferable. When lithium ions are involved in charging and discharging, the secondary battery according to this embodiment corresponds to a "lithium ion battery".

The positive electrode active substance of the positive electrode material layer, which is composed of, for example, a granular material, preferably includes a binder (also referred to as a "binding material") for sufficient contact between grains and shape retention in the positive electrode material layer. Furthermore, it is also preferable that a conductive auxiliary agent be contained in the positive electrode material layer in order to facilitate transmission of electrons for promoting the cell reaction. Similarly, the negative electrode active substance of the negative electrode material layer, which is made of, for example, a granular material, preferably includes a binder for sufficient contact between grains and shape retention, and a conductive auxiliary agent for smooth transfer of electrons promoting a cell reaction may be included in the negative electrode material layer. As described above, since the plurality of components is contained, the positive electrode material layer and the negative electrode material layer can also be referred to as "positive electrode mixture material layer" and "negative electrode mixture material layer", respectively.

It is preferable that the positive electrode active substance be a substance contributing to storing and releasing of lithium ions. In this respect, it is preferable that the positive electrode active substance be, for example, a lithium-containing composite oxide. More specifically, it is preferable that the positive electrode active substance be a lithium transition metal composite oxide containing lithium and at least one transition metal selected from the group consisting of cobalt, nickel, manganese, and iron. That is, in the positive electrode material layer of the secondary battery according to this embodiment, such a lithium transition metal composite oxide is preferably included as a positive electrode active substance. For example, the positive electrode active substance may be lithium cobalt oxide, lithium nickel oxide, lithium manganate, lithium iron phosphate, or a material in which some of their transition metals are replaced with another metal. Although such a positive electrode active substance may be included as a single material, two or more materials may be contained in combination. In a more preferable embodiment, the positive electrode active substance contained in the positive electrode material layer is lithium cobalt oxide.

The binder which can be contained in the positive electrode material layer is not particularly limited, but examples thereof may include at least one selected from the group consisting of polyvinylidene fluoride, vinylidene fluoride-hexafluoropropylene copolymer, vinylidene fluoride-tetrafluoroethylene copolymer, polytetrafluoroethylene and the like. The conductive auxiliary agent which can be contained in the positive electrode material layer is not particularly limited, but examples thereof may include at least one selected from the group consisting of carbon black such as thermal black, furnace black, channel black, ketjen black and acetylene black, carbon fiber such as graphite, carbon nanotube and vapor phase growth carbon fiber, metal powder such as copper, nickel, aluminum and silver, polyphenylene derivative and the like. In a more preferred embodiment, the binder of the positive electrode material layer is polyvinylidene fluoride, and in another more preferable embodiment, the conductive auxiliary agent of the positive electrode material layer is carbon black. In a further preferred embodiment, the binder and the conductive auxiliary agent of the positive electrode material layer are a combination of polyvinylidene fluoride and carbon black.

The negative electrode active substance is preferably a substance that contributes to storing and releasing of lithium ions. In this respect, it is preferable that the negative electrode active substance be, for example, various carbon materials, oxides or lithium alloys.

Examples of the various carbon materials of the negative electrode active substance may include graphite (natural graphite, artificial graphite), hard carbon, soft carbon, diamond like carbon and the like. In particular, graphite is preferable because it has high electron conductivity and excellent adhesion to a negative electrode current collector and the like. Examples of the oxide of the negative electrode active substance may include at least one selected from the group consisting of silicon oxide, tin oxide, indium oxide, zinc oxide, lithium oxide and the like. The lithium alloy of the negative electrode active substance may be any metal which can be alloyed with lithium and examples thereof may include a binary, ternary or higher alloy of a metal such as Al, Si, Pb, Sn, In, Bi, Ag, Ba, Ca, Hg, Pd, Pt, Te, Zn, and La, and lithium. It is preferable that such an oxide is amorphous as its structural form. This is because degradation due to nonuniformity such as grain boundaries or defects hardly occurs. In a more preferred embodiment, the negative electrode active substance of the negative electrode material layer is artificial graphite.

The binder which can be contained in the negative electrode material layer is not particularly limited, but examples thereof may include at least one selected from the group consisting of styrene butadiene rubber, polyacrylic acid, polyvinylidene fluoride, polyimide resin and polyamideimide resin. In a more preferred embodiment, the binder contained in the negative electrode material layer is styrene butadiene rubber. The conductive auxiliary agent which can be contained in the negative electrode material layer is not particularly limited, but examples thereof may include at least one selected from the group consisting of carbon black such as thermal black, furnace black, channel black, ketjen black and acetylene black, carbon fiber such as graphite, carbon nanotube and vapor phase growth carbon fiber, metal powder such as copper, nickel, aluminum and silver, polyphenylene derivative and the like. The negative electrode material layer may contain a component attributable to the thickener component (for example, carboxymethyl cellulose) used at the time of manufacturing the battery.

In a further preferred embodiment, the negative electrode active substance and the binder in the negative electrode material layer are a combination of artificial graphite and styrene butadiene rubber.

The positive electrode current collector and the negative electrode current collector used for the positive electrode and the negative electrode are members that contribute to the collection and supply of electrons generated in the active substance due to the cell reaction. Such a current collector may be a sheet-like metal member and may have a porous or perforated form. For example, the current collector may be a metal foil, a punching metal, a net, an expanded metal or the like. The positive electrode current collector used for the positive electrode is preferably made of a metal foil containing at least one selected from the group consisting of aluminum, stainless steel, nickel and the like, and may be, for example, an aluminum foil. On the other hand, the negative electrode current collector used for the negative electrode is preferably made of a metal foil containing at least one selected from the group consisting of copper, stainless steel, nickel and the like, and may be, for example, a copper foil.

The separator 3 is a member provided from the viewpoint of prevention of short circuit by contact of the positive and negative electrodes, retention of the electrolyte and the like. In other words, it can be said that the separator is a member that passes ions while preventing electronic contact between the positive electrode and the negative electrode. Preferably, the separator is a porous or microporous insulating member and has a film form due to its small thickness. Although it is merely an example, a microporous membrane made of polyolefin may be used as a separator. In this regard, the microporous membrane used as a separator may be, for example, a polyolefin containing only polyethylene (PE) or polypropylene (PP). Furthermore, the separator may be a laminate composed of a "microporous membrane made of PE" and a "microporous membrane made of PP". The surface of the separator may be covered with an inorganic grain coat layer and/or an adhesive layer or the like. The surface of the separator may have adhesion.

The electrolyte assists the movement of the metal ions released from the electrode (positive electrode/negative electrode). The electrolyte may be a "nonaqueous" electrolyte such as an organic electrolyte and an organic solvent, or may be an "aqueous" electrolyte containing water. The secondary battery of the present invention is preferably a nonaqueous electrolyte secondary battery including an electrolyte containing a "nonaqueous" solvent and a solute as an electrolyte. The electrolyte may have a form such as liquid or gel (note that the term "liquid" nonaqueous electrolyte is also referred to herein as "nonaqueous electrolyte liquid").

It is preferable to include at least carbonate as a specific solvent for the nonaqueous electrolyte. Such carbonate may be cyclic carbonates and/or chain carbonates. Although not particularly limited, examples of the cyclic carbonates may include at least one selected from the group consisting of propylene carbonate (PC), ethylene carbonate (EC), butylene carbonate (BC) and vinylene carbonate (VC). Examples of the chain carbonates may include at least one selected from the group consisting of dimethyl carbonate (DMC), diethyl carbonate (DEC), ethyl methyl carbonate (EMC) and dipropyl carbonate (DPC). In one preferred embodiment of the present invention, a combination of cyclic carbonates and chain carbonates is used as the nonaqueous electrolyte, and, for example, a mixture of ethylene carbonate and diethyl carbonate is used.

As a specific nonaqueous electrolyte solute, for example, Li salts such as $LiPF_6$ and $LiBF_4$ are preferably used.

As the current collecting lead, any current collecting lead used in the field of secondary battery can be used. Such a current collecting lead may be made of a material from which electron transfer can be achieved, and is generally made of a conductive material such as aluminum, nickel, iron, copper, stainless steel or the like. The form of the current collecting lead is not particularly limited, and may be, for example, a linear shape or a plate shape.

As the external terminal 5, any external terminal used in the field of secondary battery can be used. Such an external terminal may be made of a material from which electron transfer can be achieved, and is generally made of a conductive material such as aluminum, nickel, iron, copper, stainless steel or the like. The external terminal for a positive electrode is preferably made of aluminum, and the external terminal for a negative electrode is preferably made of copper. The form of the external terminal 5 is not particularly limited, and it is generally a plate shape. The external terminal 5 may be electrically and directly connected to the board 60 or may be electrically and indirectly connected to the board 60 with another device interposed therebetween.

The exterior body 6 is a flexible pouch (flexible bag) made of a soft sheet. The soft sheet may have softness enough to achieve folding of the seal portion, and is preferably a plastic sheet. The plastic sheet is a sheet having such a characteristic in which deformation by an external force is maintained when the external force is applied and then removed. For example, a laminate film can be used. For example, a flexible pouch made of a laminate film can be manufactured by laminating two laminate films and heat sealing the peripheral edge portion thereof. As the laminate film, a film formed by laminating a metal foil and a polymer film is generally used. Specifically, a three-layered film composed of a polymer film as an outer layer/a metal foil/a polymer film as an inner layer is exemplified. The outer layer polymer film prevents the metal foil from being damaged due to permeation and contact of moisture and the like, and polymer such as polyamide or polyester can be preferably used. The metal foil prevents permeation of moisture and gas, and a foil made of such as copper, aluminum, stainless steel or the like can be preferably used. The inner layer polymer film protects the metal foil from the electrolyte contained therein and melts it at the time of heat sealing to closes the electrolyte, and polyolefin or acid-modified polyolefin can be preferably used. The thickness of the laminate film is not particularly limited, and is preferably, for example, 1 μm or more and 1 mm or less.

Board

The board 60 may be a rigid board or a flexible board. Preferably, it is a rigid board. In the case of using the rigid board, problems of the formation of the dead space and the damage of the secondary battery due to the board are likely to occur. Even in the case where the rigid board is used in the present invention, such problems can be sufficiently avoided. As the rigid board, any rigid board used in the field of boards used together with a secondary battery can be used, and for example, a glass-epoxy resin board can be used.

Examples of the board include an (electronic) circuit board such as a printed board, a semiconductor board such as a silicon wafer, and a glass board such as a display panel and the like.

When the board is a protective circuit board for preventing overcharge, overdischarge and overcurrent of the secondary battery, a secondary battery pack is configured from the protective circuit board and the secondary battery.

The secondary battery according to the present invention can be used in various fields in which electricity storage is expected. Although it is merely an example, the secondary battery according to the present invention, particularly the nonaqueous electrolyte secondary battery can be used for electricity, information and communication fields where mobile devices are used (for example fields of mobile devices such as mobile phones, smart phones, smart watches, laptop computers and digital cameras, etc.), household/small industrial applications (for example, fields of electric power tools, golf carts, household/nursing-care/industrial robots, etc.), large industrial applications (for example, fields of forklifts, elevators, harbor port cranes, etc.), transportation system fields (for example, fields of hybrid cars, electric vehicles, buses, trains, electric assisted bicycles, electric motorcycles, etc.) power system applications (for example, fields of various power generations, load conditioners, smart grids, household installation storage systems, etc.), and space/deep sea applications (for example, fields of space probes, submersible ships, etc.).

DESCRIPTION OF REFERENCE SYMBOLS

1: Positive electrode
2: Negative electrode
3: Separator
5: External terminal
6: Exterior body 6a: upper exterior member
6b: lower exterior member
7: Boundary line between secondary battery (peripheral edge region) and cutout portion
8, 8A, B, 8C, 8D, 8E: Cutout portion
50, 50a, 50b, 50c, 50d, 50e, 50f, 50g, 50h, 50i: Folded seal portion in which seal portion is folded
51, 51a, 51b, 51c, 51d, 51e, 51f, 51g, 51h, 51i: end of folded seal portion on cutout portion side
55, 55A, 55B, 55C, 55D, 55E: Main body 56 of secondary battery, adhesive
60, 60A, 60B, 60C, 60D, 60E: board
71a, 71b, 72a, 72b, 73a, 73b, 74a, 74b, 75a, 75b: Line segment connecting with boundary line
90, 91a to 91f, 94a to 94e, 95a to 95e, 96a to 96h, 97a to 97f: Seal portion
100, 100A, 100B, 100C, 100D, 100E: Secondary battery

The invention claimed is:

1. A secondary battery comprising:
an electrode assembly including a positive electrode, a negative electrode, and a separator disposed between the positive electrode and the negative electrode; and
an electrolyte encapsulated in an exterior body,
wherein the exterior body has a shape defining a cutout portion in a planar view thereof,
wherein the exterior body has a seal portion along a peripheral edge portion thereof,
wherein at least one portion of the seal portion is folded in a thickness direction of the secondary battery into a folded seal portion such that an end of the folded seal portion is located on a cutout portion side of the seal portion, and
wherein the folded seal portion extends along the thickness direction and a height h1 of the folded seal portion is less than or equal to a height h3 of the secondary battery.

2. The secondary battery according to claim 1, wherein the end of the folded seal portion on the cutout portion side protrudes toward the cutout portion.

3. The secondary battery according to claim 1, further comprising a board within the cutout portion.

4. The secondary battery according to claim 3, wherein the height h1 of the folded seal portion and a height h2 of the board satisfy h1≥h2.

5. The secondary battery according to claim 3, wherein the folded seal portion is bonded to the board at the end on the cutout portion side.

6. The secondary battery according to claim 3, wherein the board is disposed in the cutout portion such that at least part of the seal portion defining the cutout portion overlaps an end of the board.

7. The secondary battery according to claim 6, wherein a ratio of the overlap of the at least part of the seal portion and the end of the board is 50% or more of an area of the seal portion.

8. The secondary battery according to claim 3,
wherein the secondary battery further comprises two external terminals, and
wherein the two external terminals are electrically connected to the board.

9. The secondary battery according to claim 8, wherein the external terminals protrude from the seal portion toward the cutout portion.

10. The secondary battery according to claim 3, wherein the board is a rigid board or a flexible board.

11. The secondary battery according to claim 3, wherein the board is a protective circuit board.

12. The secondary battery according to claim 1, wherein the exterior body is made of a plastic sheet.

13. The secondary battery according to claim 1, wherein the cutout portion is defined by one or more straight lines, one or more curves, or a combination of the one or more straight lines and the one or more curves.

14. The secondary battery according to claim 1,
wherein the secondary battery before a formation of the cutout portion has a quadrangular shape, and
wherein the cutout portion is disposed so as to share two sides with the secondary battery before the formation of the cutout portion.

15. The secondary battery according to claim 1, wherein the exterior body is a flexible pouch.

16. The secondary battery according to claim 1, wherein the electrode assembly has a planar lamination structure in which a plurality of electrode units including the positive electrode, the negative electrode, and the separator are laminated planarly, or the electrode assembly has a rolled winding structure in which an electrode unit including the positive electrode, the negative electrode, and the separator is wound in a roll shape.

17. The secondary battery according to claim 1, wherein the positive electrode and the negative electrode have a layer capable of storing and releasing lithium ions.

18. A device comprising:
the secondary battery according to claim 1; and
a board disposed in the cutout portion.

19. The device according to claim 18,
wherein the board is a protective circuit board, and
wherein the device is a secondary battery pack.

20. The device according to claim 18, wherein the device is a mobile device.

* * * * *